(12) United States Patent
Jackson

(10) Patent No.: US 7,399,286 B2
(45) Date of Patent: Jul. 15, 2008

(54) MASSAGE DEVICES AND METHODS OF USING SAME

(76) Inventor: Thomas Jackson, 54401 Tahquitz Dr., P.O. Box 1726, Idyllwild, CA (US) 92549

( * ) Notice: Subject to any disclaimer, the term of this patent is extended or adjusted under 35 U.S.C. 154(b) by 612 days.

(21) Appl. No.: 10/922,855

(22) Filed: Aug. 23, 2004

(65) Prior Publication Data

US 2006/0037555 A1 Feb. 23, 2006

(51) Int. Cl.
*B32B 7/02* (2006.01)
(52) U.S. Cl. .......................... 601/136; 442/97; 442/238
(58) Field of Classification Search ................ 601/134, 601/135, 136, 137, 138; 442/97, 238, 239, 442/241, 242, 246; 119/601; 602/44–56
See application file for complete search history.

(56) References Cited

U.S. PATENT DOCUMENTS

| | | | | |
|---|---|---|---|---|
| 4,843,844 A | * | 7/1989 | Hursh et al. | 66/196 |
| 5,399,418 A | * | 3/1995 | Hartmanns et al. | 428/218 |
| 5,787,541 A | * | 8/1998 | Chen | 601/137 |
| 6,108,820 A | * | 8/2000 | Bernhardt | 2/239 |

* cited by examiner

*Primary Examiner*—Steven O Douglas
(74) *Attorney, Agent, or Firm*—Nath Law Group; Jerald L. Meyer; Matthew J. Hoffa

(57) ABSTRACT

The inventive subject matter relates to multi-layered massage devices for providing a pleasurable massage sensation; for simulating a lubricant-aided massage on the skin of an animal, without the use of a lubricant; for treating or preventing a cause or a symptom of a disease, disorder, or condition in an animal in need thereof, by administering a therapeutic massage; for genital stimulation for the pleasure of a male or female human; and for producing a low friction interface between a surface of a human body and a surface of another object.

101 Claims, 3 Drawing Sheets

MASSAGE DEVICES AND METHODS OF USING SAME

BACKGROUND OF THE INVENTION

1. Field of Invention

The inventive subject matter relates to multi-layered massage devices for providing a pleasurable massage sensation; for simulating a lubricant-aided massage on the skin of an animal, without the use of a lubricant; for treating or preventing a cause or a symptom of a disease, disorder, or condition in an animal in need thereof, by administering a therapeutic massage; for genital stimulation for the pleasure of a male or female human; and for producing a low friction interface between a surface of a human body and a surface of another object.

2. Background

Most people agree that Swedish massage provides some of the most delightful sensations imaginable, in the form of gentle hand pressure gliding slowly over muscles, coaxing tension and aches away. But who has time to go to a masseuse, and what about having to undress and spread massage oil over the skin?

The inventive device offers a convenient opportunity to add the pleasure and therapeutic benefits of massage to every-day life. It can be used, for example, for treatment of pain, and even in romantic or sexual settings. The inventive device provides delightful sensations leading to relaxation, pain relief, and even sensual/sexual pleasure.

The commercial products available today generally fall into two categories: (1) smooth or textured massaging bath mitts, gloves, and cloth, related to personal hygiene and (2) textured massage mitts and gloves specially designed for producing pleasurable sensations in the massage recipient.

The former group is disclosed to be useful for skin exfoliation, opening and cleansing the pores of the skin, increasing blood circulation under the skin, rejuvenating tissues, reducing fat deposits, and leaving the skin with an improved appearance. Consistently, massaging bath mitt products are made from high-friction materials such as sisal and agave fibers, loofa, loose weave nylon, and rubber.

The latter group is disclosed to be useful for the purpose of producing therapeutic, sensual, or sexual pleasure in the massage recipient. Consistently, these massage mitts fall into two material types: natural and artificial furs, and rubber-like materials, such as natural rubber, soft plastics, gels, flexible polymers, and similar materials.

A number of U.S. Patents disclose massage devices such as gloves and mitts made of fabric or textile, massage devices which provide a "dry" massage while simulating a "wet" massage, and the use of fabrics in multiple layers to provide desired low friction characteristics. None of the patents identified by Applicant combine all of these elements as in the inventive subject matter. Further, nothing in the documents identified by Applicant teaches or suggests combining all of these elements in a single device.

U.S. Pat. Nos. 6,607,499 and 6,494,851 issued to Becher on Aug. 19, 2003 and Dec. 17, 2002, respectively, disclose real time, dry mechanical relaxation and physical therapy devices for simulating application of massage and wet hydrotherapy. The devices in the Becher patents are complex machines having pairs of massage grippers connected to and extending from the device surfaces, wherein the massage gripper pairs are capable of moving reciprocally between an open and a closed position to simulate finger manipulated massage.

U.S. Pat. No. 6,487,726 issued to Sitiku on Dec. 3, 2002, discloses a massage mitt comprised of a flexible mitt-shaped sheet, made of plastic or rubber, which has a separate thumb portion and numerous projections that are specially shaped and spaced to ensure flexibility while massaging, allowing comfortable pushing, patting and pinching throughout the surface of the flexible sheet, and a fastening device on the back that can be easily cleaned, attached or removed.

U.S. Pat. No. 6,109,070 issued to Chen on Aug. 29, 2000, discloses a bath glove woven out of yarns formed from twisted artificial fibers, wherein said yarns are hooked and pulled in specific manner to form bottom, middle, and top layers of yarns, the bottom layer of yarns forming loops to sequentially tighten the middle and top layers of yarns at predetermined intervals, such that parts of the yarns of middle and top layers between two adjacent points tightened together by the loops of the bottom yarns become loosely and upward projected, such that a difference in height exists between the middle and top layers of yarns to form a wavy, elastic and fluffy texture of the bath glove that traps more bubbles for better cleaning and massaging effect, without undesirably scratching skin.

U.S. Pat. No. 5,778,702, issued to Wrightenberry on Jul. 14, 1998, discloses a double layer sock having an inner ply having a foot portion that is undyed and a dyed outer ply covering the inner ply, wherein the inner ply is formed of antimicrobial and/or hydrophobic yarns, and the undyed section is inserted into the dyed section to form a two-ply construction having an undyed inner ply, having the characteristic of reducing friction between the wearer's foot and shoe.

U.S. Pat. No. 5,306,229 issued to Brandt, et al. on Apr. 26, 1994, discloses an articular bandage of elastic bandaging material which renders possible a selective transversal friction massage for the speedier rehabilitation of the joint functions of injured joints.

U.S. Pat. No. 4,843,844 issued to Hursh, et al. on Jul. 4, 1989, discloses an anti-friction two-ply athletic sock, especially for jogging or other athletic activity, having a foot portion which includes an inner ply having a first inner surface formed to make relatively high frictional contact with the skin of the wearer and a second, outer surface having relatively low frictional characteristics, wherein the inner ply is inserted within and fixed to an outer ply which includes a first inner surface having relatively low frictional characteristics disposed adjacent said second surface of said first ply and a second, outer surface having a relatively high frictional surface adapted to make contact with the interior of a shoe.

U.S. Pat. No. 4,615,188 issued to Hursh, et al. on Oct. 7, 1986, discloses a two-ply athletic sock, especially for jogging or other athletic activity, having a foot portion consisting of a first inner layer or ply disposed inside a second outer layer or ply, the first ply of the foot portion having an inner surface adapted to contact the skin formed principally of yarns having high frictional characteristics, high thermal conductivity, and low moisture regain, its opposed surface formed principally of yarns having relatively low frictional characteristics, and a second ply having an inner surface which has low frictional characteristics and its outer surface is formed of yarns having relatively high frictional characteristics and high moisture regain, the latter surface optionally formed with terry loops to enhance its shock-absorbing construction as well as to increase its moisture absorbing capacity.

U.S. Pat. No. 4,571,960 issued to Hursh, et al. on Feb. 25, 1986, discloses a two-ply athletic sock, having relatively low friction characteristics, permits the inner ply (in use) to slide relative to the outer ply for greater foot comfort and avoidance of blisters, said sock having a foot portion consisting of a first inner layer or ply disposed within and attached to a second outer layer or ply, the first or inner ply having (a) an inner (next-to-the-foot) surface comprising a plurality of moisture-absorbing fibers such as cotton fibers around which a yarn such as a nylon yarn is spirally wound and also having (b) an outer surface comprising yarns of nylon, for example, having relatively low friction characteristics compared with said inner surface, and a second or outer ply, having (a) an inner surface comprising yarns of nylon, for example, which also have relatively low friction characteristics and (b) an outer surface plaited on the yarns of the inner surface comprising a plurality of moisture-absorbing fibers such as cotton around which a yarn such as nylon is spirally wound.

U.S. Pat. No. 4,067,325, issued to Olask on Jan. 10, 1978, discloses a friction massage or rubbing material for use on the surface of the human body to remove dead skin and to generally give a feeling of good tone, in the form of a strap or mitten which includes a rubbing surface to be rubbed over the human body, said member composed of strands knitted in a pattern defining a surface with high and low areas adjacent to one another, and which strands are composed of a mixture of vegetable and animal fibers at a ratio of about 50% each and wherein the vegetable fiber component is about 50% sisal and 50% alfa and the animal hair is about 50% coarse animal hair, such as horse hair, and 50% fine animal hair, such as elephant hair.

Using a fur cloth, mitt, or glove to massage or stroke a subject is designed to produce the obvious smooth and silky sensations one would ordinarily expect from fur placed in contact with exposed skin. However, Applicant is aware of no products which are disclosed to produce such sensations using a fabric. The lack of such products is unexpected, and perhaps is indicative of the current marketing strategy for products of this type. Further, Applicant is unaware of any low-friction fabric or textile massage products, particularly having a multi-layer design and/or for use in producing the unexpected massage effects of the inventive subject matter in a clothed subject.

Conversely, rubber-like massage mitts are consistently marketed as having some variety of surface texturing, such as nubs or "fingers," and with the consistent recommendation for use with a lubricant, such as oil, soap, or powder. Applicant is unaware of any products which produce the sensation of a lubricant-aided massage using only a fabric or textile material, which produce the sensation of a lubricant-aided massage without the use of a lubricant, or which produce the sensation of a lubricant-aided massage in a clothed subject.

Thus, the inventive devices are an ideal solution to these problems. The same sensations as massage with oil on bare skin can be achieved, even through clothing. On bare skin it feels wonderful, but, amazingly, one can create the feeling of being massaged with oil right through clothing. With the inventive device, this experience can always be available and there is no mess and no clean up.

The inventive devices provides a means of transmitting hand pressure, in a nearly frictionless manner, over skin, muscle, and various body parts. In each device there is a minimum of one "silk-to-silk" interface, so horizontal movement remains nearly frictionless regardless of the nature of the surface it is laid upon or the characteristics of the skin of the person doing the massage. The sensations that are created are consistent-perfectly smooth and "silky". And this is maintained even if the device is soaking wet.

The essentially frictionless nature of the inventive device provides significant advantages beyond pleasant sensations. Massage done in this manner is much easier to perform and results in less fatigue of finger muscles. This is an important advantage for the average person, since most people do not perform massage regularly and have not developed much strength in the particular muscles involved. The novice would usually tire after only a few minutes, but with the inventive device they can perform a massage much longer. This feature will also make the work of professional masseuses and masseurs much easier. Another advantage is that if a recipient's muscles are sore, they can be worked on with much less pain. In addition, hand pressure that is applied in this fashion makes it easier for the recipient to keep muscles relaxed, which enhances the tension releasing, therapeutic benefits of massage.

SUMMARY OF THE INVENTION

The inventive subject matter relates to a multi-layered device for providing a pleasurable massage sensation to an animal, comprising:
 (a) a first non-rigid material layer having a first surface and a second surface; and
 (b) a second non-rigid material layer having a first surface and a second surface,
  wherein when said first surface of said first material layer and said first surface of said second material layer are oriented so as to define a surface-to-surface interface between said first and second material layers, and a fabric index of said interface between said first and second material layers is greater than or equal to about 10.

The inventive subject matter further relates to a method for simulating a lubricant-aided massage on the skin of an animal, without the use of a lubricant composition on the skin of said animal, comprising the steps of:
 (a) providing a multi-layer massage device comprising:
  (i) a first non-rigid material layer having a first surface and a second surface;
  (ii) a second non-rigid material layer having a first surface and a second surface,
   wherein said second surface of said first material layer and said second surface of said second material layer are oriented so as to define an internal surface-to-surface interface between said first and second material layers, and said first and second material layers are fixedly attached together to form a first double layer element;
  (iii) a third non-rigid material layer having a first surface and a second surface; and
  (iv) a fourth non-rigid material layer having a first surface and a second surface,
   wherein said second surface of said third material layer and said second surface of said fourth material layer are oriented so as to define an internal surface-to-surface interface between said third and fourth material layers, and said third and fourth material layers are fixedly attached together to form a second double layer element, and
   wherein a fabric index of an external surface-to-surface interface between the first surfaces of a pair of material layers is greater than or equal to about 10;
 (b) orienting said massage device such that a first surface of one of said double layer elements is in contact with said animal; and
 (c) manipulating said massage device in a manner that said manipulation results in sliding between said first surfaces of said first and second double layer elements at said external surface-to-surface interface.

Additionally, the inventive subject matter relates to a method for treating or preventing a cause or a symptom of a disease, disorder, or condition in an animal in need thereof, by administering a therapeutic massage, comprising the steps of:

(a) providing a multi-layer massage device comprising:
  (i) a first non-rigid material layer having a first surface and a second surface;
  (ii) a second non-rigid material layer having a first surface and a second surface,
    wherein said second surface of said first material layer and said second surface of said second material layer are oriented so as to define an internal surface-to-surface interface between said first and second material layers, and said first and second material layers are fixedly attached together to form a first double layer element;
  (iii) a third non-rigid material layer having a first surface and a second surface; and
  (iv) a fourth non-rigid material layer having a first surface and a second surface,
    wherein said second surface of said third material layer and said second surface of said fourth material layer are oriented so as to define an internal surface-to-surface interface between said third and fourth material layers, and said third and fourth material layers are fixedly attached together to form a second double layer element, and
    wherein a fabric index of an external surface-to-surface interface between the first surfaces of a pair of material layers is greater than or equal to about 10;
(b) orienting said massage device such that a first surface of one of said double layer elements is in contact with said animal; and
(c) manipulating said massage device in a manner that said manipulation results in sliding between said first surfaces of said first and second double layer elements at said external surface-to-surface interface.

Further, the inventive subject matter relates to a method for genital stimulation, for the pleasure of a male or female human, comprising the steps of:

(a) providing a multi-layer massage device comprising:
  (i) a first non-rigid material layer having a first surface and a second surface;
  (ii) a second non-rigid material layer having a first surface and a second surface,
    wherein said second surface of said first material layer and said second surface of said second material layer are oriented so as to define an internal surface-to-surface interface between said first and second material layers, and said first and second material layers are fixedly attached together to form a first double layer element;
  (iii) a third non-rigid material layer having a first surface and a second surface; and
  (iv) a fourth non-rigid material layer having a first surface and a second surface,
    wherein said second surface of said third material layer and said second surface of said fourth material layer are oriented so as to define an internal surface-to-surface interface between said third and fourth material layers, and said third and fourth material layers are fixedly attached together to form a second double layer element, and
    wherein a fabric index of an external surface-to-surface interface between the first surfaces of a pair of material layers is greater than or equal to about 14;
(b) orienting said massage device such that a first surface of one of said double layer elements is in contact with the genitals of said animal; and
(c) manipulating said massage device in a manner that said manipulation results in sliding between said first surfaces of said first and second material layers at said surface-to-surface interface.

In addition, the inventive subject matter relates to method for producing a low friction interface between a first surface, which is a surface of a human body, and a second surface, which is a surface of another object, comprising the steps of:

(a) providing a multi-layer interface device comprising:
  (i) a first non-rigid material layer having a first surface and a second surface; and
  (ii) a second non-rigid material layer having a first surface and a second surface,
    wherein said first surface of said first material layer and said first surface of said second material layer are oriented so as to define a surface-to-surface interface between said first and second material layers, and
    wherein a fabric index of said interface between said first and second material layers is greater than or equal to about 10; and
(b) orienting said interface device such that said second surface of said first material layer is in contact with said animal, and said second surface of said second material layer is in contact with said second surface of said other object,
    wherein upon application of a force to said animal or said other object, said interface device permits sliding between said first surfaces of said first and second material layers.

DETAILED DESCRIPTION OF THE INVENTION

Definitions

Figure 1A:
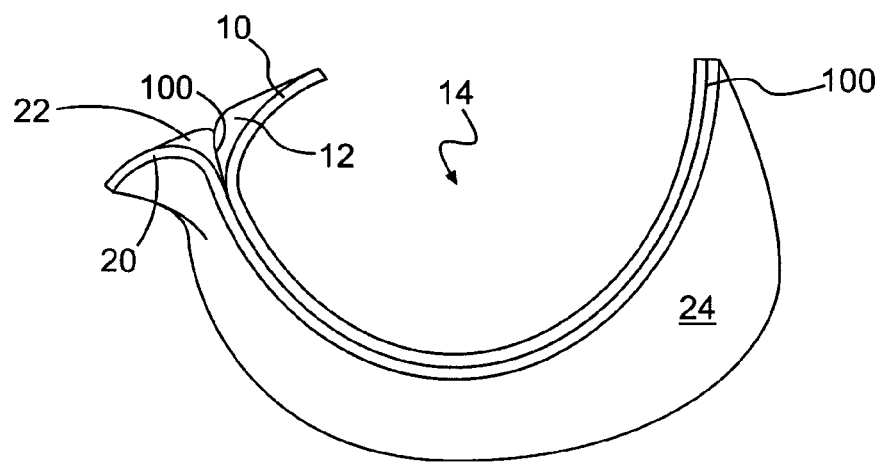
FIG. 1A is a perspective drawing which depicts a conceptual device, having two round material layers oriented so that a surface-to-surface interface between the first surfaces of two material layers has a fabric index of said greater than or equal to about 10, according to the inventive subject matter.

The term "material" refers to goods in non-rigid, sheet form, for example woven fabrics, knit fabrics, non-woven fabrics, and flexible films, and includes traditional fabrics made by weaving, felting, knitting, or crocheting natural or synthetic fibers.

The term "fabric index" refers to a mathematical relationship defined by the formula where Fabric Index ("FI") equals Smoothness Ratio divided by Warp Direction Friction, as follows:

$$FI = MMD1/MMD2 \div MIU1$$

where the following terms are defined using the Kawabata fabric evaluation system:

MIU1 is friction in the warp direction;
MIU2 is friction in the weft direction;
MMD1 is mean deviation of MIU in the warp direction (smoothness);
MMD2 is mean deviation of MIU in the weft direction (smoothness);
SMD1 Surface mean deviation in the warp direction (roughness in microns); and
SMD2 Surface mean deviation in the weft direction (roughness in microns).

The term "warp direction" refers to the direction of the group of yarns that make up the longitudinal part of a fabric; also called the "chain". In weaving a fabric, warp yarns run along the length of the loom.

The term "weft direction" refers to the direction of the yarns that run across the fabric from selvage to selvage, and which run perpendicular to the warp yarns; also called the filling, pick, or woof yarns.

The term "knitting" refers to a method of constructing a fabric by interlocking series of loops of one or more yarns. Two main methods are warp knitting and weft knitting. "Warp knit" refers to a type of knitted fabric construction in which the yarns are formed into stitches in a lengthwise manner; warp knits are generally less elastic than weft knits. Common examples of warp knits are tricot knits and raschel knits. "Weft knit" refers to a type of knitted fabric in which yarns are formed into stitches in widthwise manner. Common examples of weft knits are circular knits and flat knits.

The term "weaving" refers to a process of making cloth. There are three fundamental weaves: plain, satin and twill. In a plain weave, each filling yarn passes successively over and under each warp yarn, alternating each row. In a satin weave, the face of the fabric consists of almost completely warp or filling floats produced in the repeat of the weave. Satin weave has a characteristic, lustrous surface and has a considerably greater number of yarns in the set of the threads, either warp or filling, that forms the face. A twill weave has diagonal lines produced by a series of floats staggered in the warp direction. The floats are normally formed by the filling.

The term "yarn" refers to a continuous strand of textile fibers, filaments, or other material in a form suitable for knitting, weaving, or otherwise intertwining to form a textile fabric. Exemplary yarn types are as follows: spun yarn has a number of fibers twisted together; filament yarn has a number of filaments laid together without a twist; textured filament yarn has a number of filaments laid together with a degree of twist; monofilament has a single filament with or without twist; and specialty and novelty yarn, such as Chenille, Boucle, and Ratine.

The term "fixedly attached" refers to permanent or temporary mechanical attachment by a suitable fixing or fastening technique which is appropriate for the particular characteristics and construction of the material being attached.

The term "iconic" refers to a representation or picture of a person or thing which is the object of widespread attention or devotion.

The term "textured," as used herein in relation to materials, refers to a material having a surface roughness. Textured filament yarns have had the filaments disarranged so that the yarn is no longer smooth and compact. Exemplary types of textured fabrics include terry, corduroy, velvet, boucle, pique, fleece, rib knit, and dupioni.

The term "sliding" refers to the process of moving over a surface, with sliding friction sufficiently low to permit maintaining smooth, continuous contact between surfaces. Sliding friction refers to the resistance one body meets in sliding along the surface of another body.

The terms "frictionless" and "essentially frictionless," as used herein in relation to material layers, refer to a condition in which the layers slide across one another upon the application of force having a force component which is perpendicular, or normal, to the surface of a material layer.

The terms "treating or preventing" refers to the process of producing an effect on biological activity, function, health, or condition of an organism in which such biological activity, function, health, or condition is maintained, enhanced, diminished, or treated in a manner which is consistent with the general health and well-being of the organism.

Massage Devices

The inventive devices provide a means of transmitting hand pressure, in a nearly frictionless manner, over skin, muscle, and various body parts. In each device there is a minimum of one "silk-to-silk" interface, so horizontal movement remains nearly frictionless regardless of the nature of the surface it is laid upon or the characteristics of the skin of the person doing the massage. The sensations that are created are consistent-perfectly smooth and "silky". And this is maintained even if the device is soaking wet.

The essentially frictionless effect of the inventive device is achieved by using at least one, and preferably two to four double-layers of specially selected fabrics. Applicant has found that very smooth fabrics, almost universally, have a predominance of fibers that are parallel to each other, running in one direction. If any two adjacent layers are aligned with their parallel fibers lined up in the same direction, there are subtle fabric grooves that fall into one another, causing them to snag or lock, resulting in dramatically increased friction. Thus, the "smooth" face of a fabric layer is aligned at angles from zero to 90 degrees relative to any adjacent layer(s). In its simplest form, an inventive device comprises only two fabric layers, such as is used in the inventive method for producing a low friction interface between first and second surfaces, described in detail below.

However, for purposes of the methods for simulating a lubricant-aided massage; for treating or preventing a cause or a symptom of a disease, disorder, or condition by administering a therapeutic massage; and for genital stimulation for pleasure, Applicant has found that all fabrics presently known to him, which have a face with very low friction, also have a relatively rough opposite side with relatively high friction, and the rough, high friction face does not alone provide a suitable interface with animal skin, particularly human skin. Thus, as described in detail below, the preferred device for these uses is minimally comprised of two fabric double-layer elements, where all rough fabric faces are in direct interface only with other rough fabric faces, while all fabric faces in contact with skin are smooth surfaces. It will be apparent from a requirement for devices which contact skin in the inventive methods that, in order to have the additionally required "slippery" interface, the minimal device for these uses has a total of at least four fabric layers arranged in order, oriented in relation to a massage recipient's skin as follows: (1) a first fabric layer, oriented with the smooth side toward the skin and the rough side away from the skin, (2) a second fabric layer, oriented with the rough side interfacing with the rough side of the first fabric layer, (3) a third fabric layer, oriented with the smooth side interfacing with the smooth side of the second fabric layer, and (4) a fourth fabric layer, oriented with the rough side interfacing with the rough side of the third fabric layer. As discussed in detail below, the edges of the fabric layers are optionally fixed together, such as by sewing or stitching at the perimeter of the fabric pieces, and the minimal preferred device is optionally sewn or stitched together into two double layer elements or into a single four-layer unit.

Applicant understands that one of ordinary skill in the fabric arts would refer to fabric is as having a "face", which is the surface that faces out in garments, and a "back", referring to the opposite side. In order to maintain consistency and avoid any confusion which might result from referring to a face and back of a material layer, Applicant uses the term "first surface" (exemplary reference characters 12, 22, 32, and 42) in referring to the low-friction, "smooth face" of a material layer, and "second surface" (exemplary reference characters 14, 24, 34, and 44) in referring to the back, high-friction "rough face" of a material layer. It should also be understood that not all fabrics have a low-friction, "smooth face", and the inventive subject matter is limited to those fabrics which have at least one low-friction, "smooth face".

As discussed in detail below, exemplary uses and applications of the inventive devices include the following:

1. Household uses for the treatment of physical pain such as headaches, neck/shoulder/back aches, strained or sore muscles, etc. Individuals can provide much of this for themselves and couples can treat one another. Video instruction programs demonstrating massage techniques and appropriate use of acupressure points can be provided.

2. Use by professional masseuses and masseurs. The inventive device, in addition to creating wonderful sensations, makes it less taxing for massage givers, who generally avoid working more than six hours a day because the work is so exhausting. It will also provide more time for actual massaging, as no time is needed for application of massage oils and, if client remains dressed, no moving of towels/drapes is required. Ideal for the new "mobile massage" services that come to businesses to provide quick massages for employees.

3. Medical Therapeutics, such as Chiropractors and Physical Therapists.

4. Parties or family gatherings. People can just have fun with it and discover who in their group has the best massage technique.

5. People who yearn for pleasant physical sensations can provide this for themselves. For example, many people enjoy relaxing activities while watching TV or traveling in the car.

6. Infants and children. A common problem experienced by parents is the need for an effective means of calming children down who are upset or crying from any number of causes, such as frustration, boredom, physical discomfort, pain, tiredness, unpleasant interactions with other children, or sickness. Before young children have developed verbal skills, an upset child can be particularly taxing on their caregiver who may have no idea what is wrong or how to comfort them. The inventive device provides a means to easily, in virtually any situation, provide an immediate sense of comfort and relaxation, which often has a positive impact on a child's mood. There is a nearly universal and automatic reaction to the soothing sensations of massage, in both adults and children. This same technology can also be used by parents to help children who have difficulty falling asleep. Puppet massagers could be designed for this purpose.

7. Sports trainers are expected to utilize the inventive devices and methods for treating injuries, strains, and sore muscles.

8. Pet massage. Owners who are allergic to their animals can pet them and minimize allergic reactions. But non-allergic pet owners will enjoy petting their pet with the inventive device simply because they love being petted in this manner. Animals are used to being petted through a fur coat. The same way that the inventive device works through clothing, it works through an animal's coat, creating a unique and pleasant sensation. Field testing indicates that animals enjoy the sensations that are created much more than normal petting. A version specifically for use with pets is considered for sale through pet stores.

9. Couples who wish to have affectionate physical interaction in non-private situations that would normally be uncomfortable, such as watching television with family members present, picnics, vacationing with children, etc.

10. Anyone who wishes to express physical affection, especially when sexual relations are not appropriate, such as involving teenagers and friends.

11. Older seniors who are no longer sexually active, for whatever reason, but who yearn for physical touch and expression of affection with their mate.

12. Nursing home or skilled nursing facilities, in which the clinical staff can use the technology to assist them in calming agitated residents as an alternative to chemical or physical restraints.

13. Romantic and caring interaction for couples. An ideal tool for couples who want to increase intimacy by caring for one another and making each other feel good, short of actual intercourse or other sexual behaviors. Most couples receive a great deal of benefit from sharing pleasurable sensual experiences. This form of affection is an important contribution to any healthy relationship. The inventive device has the potential to both encourage and enhance such experiences.

14. Transitions to sexual activity. Some couples have a general lack of romantic interaction and very limited means of transitioning from every-day activities to romantic/sexual activity. Initiating sexual activity can be awkward, which may partly account for the fact that most couples have sex less than once a week. Since the inventive device has most of its surprising effects through virtually any type of clothing, it is particularly effective as a convenient means of connecting to one's partner and transitioning to more intimate interactions. If one wants to initiate sexual activity, he/she will find it much easier to accomplish this by casually offering a massage. It requires much less courage to ask if a partner would like a foot rub or back rub compared to asking if they are in the mood for sex, and it minimizes the potential for embarrassment and rejection. Even if the partner isn't in a sexual mood at that moment, it provides a means of changing the atmospherics, connecting, and perhaps coaxing their partner into a new mood. Massage provides an immediate, relaxing connection that can create a very natural, sensual transition to take a couple from the couch to the bed.

15. Treatment of sexual problems. The inventive device can be used alone or in conjunction with such devices as described in Applicant's U.S. patent application Ser. No. 10/867,009, as part of a program for the treatment of both erectile dysfunction and premature ejaculation.

16. Enhancement of the male sexual experience. The inventive device is effective for enhancement of the male sexual experience, especially when combined with other devices, for example, for enhancing erectile function. The variety of intense and pleasurable sensations that can be created is virtually endless, especially when multiple inventive devices are combined. A significant percentage of women are uncomfortable touching male genitalia. The inventive device provides a way for these women to stimulate their partner's genitals in a manner that is more comfortable for them.

17. Enhancement of the female sexual experience. The inventive device has the potential to significantly impact female sexual satisfaction because of the likelihood that women will receive greater sensual and sexual stimulation. One of the issues that the device may address is the fact that women usually do not produce sufficient natural lubricants until they are sexually stimulated, and they do not tend to become sexually stimulated without general sensual stimulation or direct genital stimulation. The inventive device provides a means to stimulate women, generally or directly, before natural lubricants are produced, and without using artificial lubricants. Even after natural lubrication has occurred, the inventive device can be used for orgasmic pleasure, since the pleasant sensations are independent of the fabric becoming wet. In addition, the inventive devices are washable.

18. Enhancing bedroom affection. One of the most delightful aspects of the inventive devices is what Applicant calls "hug and rub". The ideal means of promoting this use is to keep an inventive device under each bed pillow. Then, when a couple is feeling affectionate, the inventive devices are readily available to be taken out, by either person, and used to gently rub the others' back, or the back of their neck or head while they are hugging and/or kissing. The inventive devices can, obviously, be used to rub over any part of the body in much sexier ways, but if used in this manner while hugging, it creates very tender, relaxing, and delightful interactions.

Thus, the inventive subject matter relates to a multi-layered device for providing a pleasurable massage sensation to an animal, comprising:
(a) a first non-rigid material layer (10) having a first surface (12) and a second surface (14); and
(b) a second non-rigid material layer (20) having a first surface (22) and a second surface (24),
wherein when said first surface (12) of said first material layer (10) and said first surface (22) of said second material layer (20) are oriented so as to define a surface-to-surface interface (100) between said first and second material layers, and a fabric index of said interface between said first and second material layers (100) is greater than or equal to about 10.

For general massage, the lower the coefficient of friction the better, and under most circumstances a preferred Fabric Index value is above about 10, although a marginally effect device has a Fabric Index above about 7 or 8. Below this Fabric Index value, the fabric interface for the fabrics tested does not slip. Applicant is cognizant that future developments in the textile field, or other sheet material field for that matter, may yield new materials which have a Fabric Index below the lower limit presently considered effective for the inventive subject matter, while having sufficient first surface-to-first surface slippage; such materials are expected to be equivalent to the inventive subject matter and thus within the scope of the present claims.

One of ordinary skill in the art will recognize that the independent claims are understood to encompass both treated and non-treated fabrics. Another aspect of the inventive subject matter is directed to fabrics that are treated. In a preferred embodiment, one or more of said first material surfaces is treated with a friction inhibiting treatment. Fabrics optionally may meet the Fabric Index criteria either before or after being sprayed or otherwise treated with a friction eliminating treatment, for example Dupont Teflon® Fabric Protector.

Applicant is unaware of any fabric that has the desired surface characteristics, as shown by appropriate Fabric Index values for both sides of a single piece of fabric. If such fabric(s) currently exist, or is/are later developed, such an embodiment is intended to be within the scope of the inventive subject matter.

In another preferred embodiment, said non-rigid material is selected from the group consisting of woven fabrics, knit fabrics, non-woven fabrics, and flexible films. The fabrics indicated are in general conventional woven textile products. In particular, flexible films are intended to encompass other non-rigid sheet materials which nevertheless exhibit the characteristics to fall within the scope of the claims herein.

In a more preferred embodiment, said non-rigid material is a woven fabric.

In another more preferred embodiment, said first surface of said first layer of material has a warp dimension and a weft dimension, said first surface of said second layer of material has a warp dimension and a weft dimension, and at the interface, the warp dimension of said first layer of material is oriented substantially parallel to the weft dimension of said second layer of material. In use, the inventive subject matter permits variations in friction between double layers as the angle between them is varied. At 90 degrees, the friction is minimal and at 0 degrees it is maximal. If two double layers were round and they were affixed in an adjustable manner, such as by small hook and loop strips, it would allow for adjusting the friction, and thus the feel, of the inventive device.

An adjustable design is also contemplated to be within the scope of the inventive subject matter. For example, when using an inventive device in a towel configuration, to dry oneself off, the middle interface moves and the bottom layer, next to the skin, does not. This makes it less efficient at absorbing the water that the user wants to remove, because the bottom layer stays essentially fixed in one spot. While this effect can be overcome by pulling the towel from the edges, setting the angles of the layers of the inventive device to have more friction, i.e. less than the optimal sliding orientation at 90 degrees and closer to zero degrees, permits more efficient use in this application. Such an inventive device is optionally readjusted to a new angle, closer to 90 degrees, that would have minimal friction, to again act as regular inventive device.

It is to be noted that the inventive devices can be folded over, corner to corner, which doubles the thickness and keeps the parallel fibers on each layer at a ninety degree angle, and thus allows for a frictionless interface, creating an additional new sensory experience.

Thus, in another aspect of the inventive device, said first non-rigid material layer (10) is fixedly attached to a third non-rigid material layer (30) having a first surface (32) and a second surface (34), to form a first double layer element (200), and said second non-rigid material layer (20) is fixedly attached to a fourth non-rigid material layer (40) having a first surface (42) and a second surface (44), to form a second double layer element (202), wherein for each said double layer element, said second surfaces are oriented so as to define an internal surface-to-surface interface (110) between a pair of material layers, wherein a fabric index of an external surface-to-surface interface (120) between a pair of double layer elements is greater than or equal to about 10.

Figure 1B:
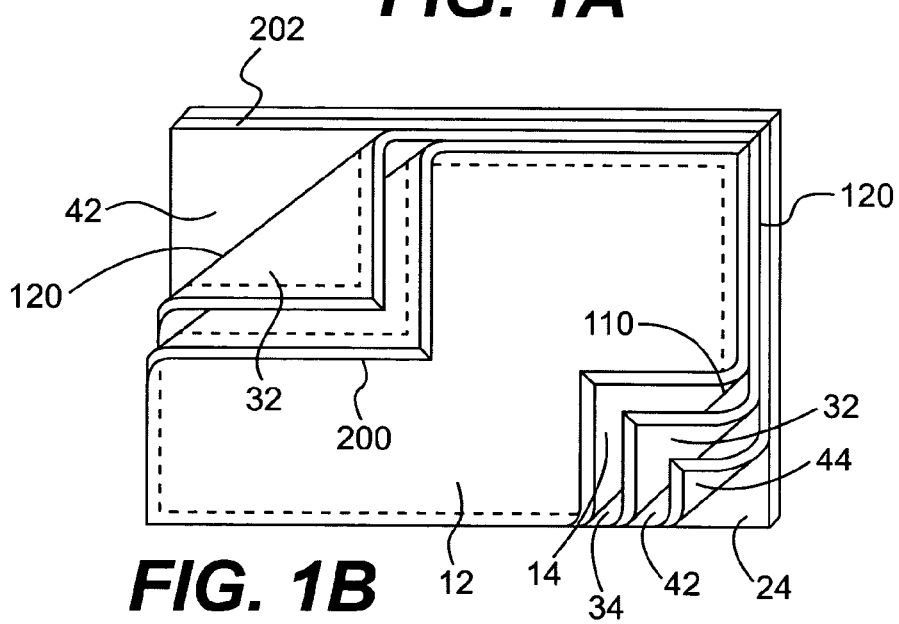
FIG. 1B is a perspective drawing which depicts a basic exemplary device, having two double-layer elements with stitched edges, according to the inventive subject matter.

One of ordinary skill in the art will understand that in referring to an "external surface-to-surface interface", Applicant is referring to an interface (for example, 120) between the low-friction first surfaces of two material layers (for example, as depicted in FIG. 1B by reference characters 32 and 42), which are part of two different double layer elements. Similarly, an "internal surface-to-surface interface" refers to an interface (for example, 110) between the high-friction second surfaces of two material layers (for example, as depicted in FIG. 1B by reference characters 14 and 34 or 24 and 44), which are part of the same double layer element.

In another aspect of the inventive subject matter, said first material layer has a perimeter defined by the edge(s) of said first material layer, said second material layer has a perimeter defined by the edge(s) of said second material layer, and said first and second material layers are fixedly attached together substantially at said perimeters.

In a preferred embodiment, said first material layer and said second material layer are of substantially the same size and shape.

In a more preferred embodiment, said shape is selected from the group consisting of generally rectangular, generally rectangular with radiused corners, generally triangular, generally a parallelogram, generally circular, ellipsoid, or iconic.

In another more preferred embodiment, said iconic shape is selected from the group consisting of a hand shape, puppet shapes, a blanket shape, the shape of an article of clothing, the shape of a sporting goods article, a shape associated with a sports team or league logo, a shape associated with a sports league trophy, and a trademarked shape. In another embodiment, the inventive device is configured as silk sheets or a robe, which are in essence large versions of an inventive device.

Device Configurations. Exemplary variations for the inventive devices include the following:

1. A variety of sizes and shapes, such as a rectangular shape could provide a convenient width for full shoulder massage. Different sized squares, rectangles, oblongs, or circles could be provided to meet personal preferences.

2. A variety of inventive device thicknesses. Thicker inventive devices provide slightly different sensations. For use over particularly sore muscles, a thicker inventive device creates more diffuse pressure and is more comfortable. For example, the difference between a two and three double layer inventive device is subtle, but discernable.

3. A variety of subtly different sheens or fabric thickness can be utilized, each creating slightly different sensations.

4. Baby blanket size. Many children love the feeling of silky fabric. A "Magic Blanket" would make it convenient for parents to provide soothing massages to their children to help them unwind and prepare for them for sleep, or when they are upset or crying for any reason.

5. Massage puppets for use with children.

6. Body size devices, such as lounging robes, blankets, etc.

7. Therapeutic or sensual clothing or lingerie.

8. Color and pattern variations. A novelty aspect of the inventive devices can be maximized by creating a variety of colors and designs. The design variations will allow for focused marketing themes: special holidays, weddings, sports, baby showers, and so forth.

In a further more preferred embodiment, said first material layer and said second material layer are fixedly attached together by process selected from the group consisting of sewing, stitching, stapling, gluing, riveting, heat bonding, mechanical joining, and mechanical fastening.

In a most preferred embodiment, said first material layer and said second material layer are fixedly attached together by sewing or stitching.

In another aspect of the inventive subject matter, said device further comprises a finishing strip (16) substantially covering the edges of a pair of material layers.

In a further aspect of the inventive subject matter, said device further comprises one or more additional double layer element(s), each said additional double layer element comprising:

(a) a first non-rigid material layer (10) having a first surface (12) and a second surface (14); and (b) a second non-rigid material layer (20) having a first surface (22) and a second surface (24), wherein for each said additional double layer element, said second surface (14) of said first material layer (10) and said second surface (24) of said second material layer (20) are oriented so as to define an internal surface-to-surface interface (110) between said first and second material layers.

In another aspect of the inventive subject matter, one or more of said first material surfaces are treated with a friction inhibiting treatment.

In a preferred embodiment, a fabric index of an external surface-to-surface interface between two or more double layer elements is greater than or equal to about 10.

In a more preferred embodiment, a fabric index of said external surface-to-surface interface between the first material layers of all of said double layer elements is greater than or equal to about 10.

In another preferred embodiment, all of said first material surfaces are treated with a friction inhibiting treatment. It is preferred that each double layer element slides on each adjoining double layer element.

In a further aspect of the inventive subject matter, each said double layer element has a perimeter defined by the edge(s) of said material layers, and each said double layer element is fixedly attached together substantially at said perimeter.

In yet another aspect of the inventive subject matter, said device further comprises a finishing strip (16) substantially covering the edges of one or more of said additional double layer element(s).

The number of double layer elements utilized in a device is unlimited, as is the number of individual layers that a user may wish to use juxtaposed against one another. In a preferred embodiment, said device comprises less than about ten double layers.

Figure 1C:
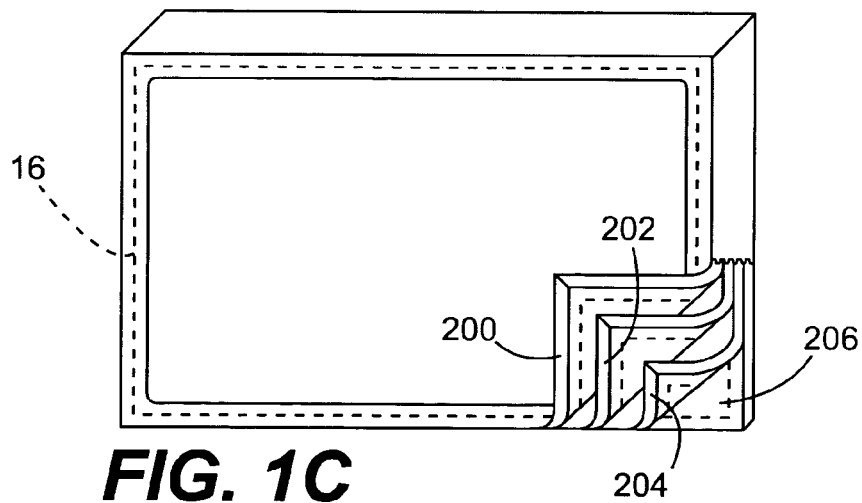
FIG. 1C is a perspective drawing which depicts an exemplary device, having four double-layer elements bound together by a finishing strip, with a partially exploded view, omitting the finishing strip at the lower right, according to the inventive subject matter.

In a more preferred embodiment, said device comprises a plurality of double layer elements numbering between two and five double layer elements. FIG. 1C depicts an inventive device having four double layer elements (200, 202, 204, and 206).

In a preferred embodiment, said fabric index of said interface between said first surfaces of said first and second material layers is greater than or equal to about 15.

In a more preferred embodiment, said fabric index of said interface between said first surfaces of said first and second material layers is greater than or equal to about 20.

In a most preferred embodiment, said fabric index of said interface between said first surfaces of said first and second material layers is greater than or equal to about 25.

In yet another aspect of the inventive subject matter, said device additionally comprises a non-rigid, textured material layer (50) having a textured surface (52), wherein said textured surface is oriented so as to define a surface-to-surface interface (130) between (a) said textured surface and (b) either said first or said second surface of any of said material layer(s).

The inventive device with a textured layer added is similar to the basic inventive device, but it is also significantly different. It uses the same principle of a "frictionless" interface, to allow the hand to slide over skin. But in addition, it includes a specially selected textured fabric to create particular sensations. One of ordinary skill in the art will understand that textured fabrics are textured on one surface, or on both surfaces. Thus, a textured material layer having a single textured surface will define a surface-to-surface interface (130) between said textured surface and one surface, preferably a second surface, of a material layer. A textured material layer having two textured surfaces will define a surface-to-surface interfaces with two material layers, each defining a surface-to-surface interface between a textured surface and a surface, preferably a second surface, of a material layer.

Single or multiple pieces of textured fabric can be placed under or inside the inventive device for added sensory variations. The inventive subject matter is optionally combined with other fabrics with different frictional and topographical characteristics to create alternative sensations for the user. By placing textured fabric(s) on the user's skin and rubbing the inventive device over it/them, the user will experience a variety of pleasant textured sensations.

An unexpected result of using the inventive device with additional textured layer(s) added has been that it is very useful for general massage. It provides a different experience than the basic inventive device and has been described by users as feeling very relaxing and yet stimulating. It has varying characteristics depending on the amount of pressure exerted over it, and should generally be used with less pressure than the basic inventive device in order to permit full appreciation of the subtle differences in sensations.

Figure 2A:
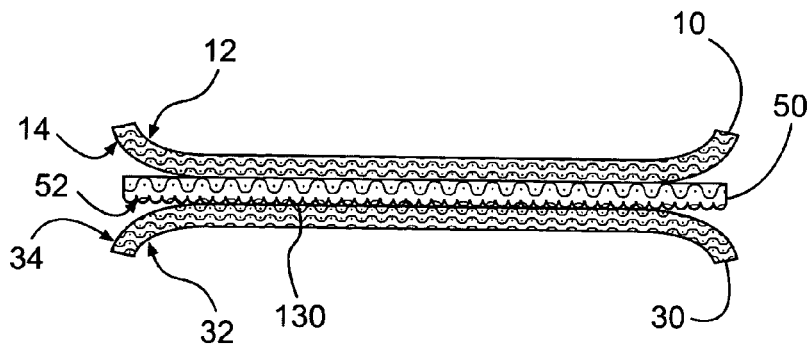
FIG. 2A is a cross-sectional drawing which depicts a single double-layer element structure having a textured layer, according to the inventive subject matter.

In a preferred embodiment, said textured material layer (50) is oriented between said second surfaces of the material layers (for example, as depicted in FIG. 2A as reference characters 14 and 34) of a double layer element (200).

In another preferred embodiment, said additional double layer element additionally comprises a non-rigid, textured material layer (50) having a textured surface (52), wherein said textured surface is oriented so as to define a surface-to-surface interface (130) between (a) said textured surface and (b) either surface of either material layer of said double layer element.

In one preferred embodiment, said device comprises a plurality of double layer elements, and further comprises one textured material layer.

In another preferred embodiment, said device comprises a plurality of double layer elements, and further comprises a textured material layer for each double layer element.

In a further preferred embodiment, said device comprises a plurality of double layer elements, and further comprises a plurality of textured material layers which is greater than one and less than the number of double layer elements.

In another preferred embodiment, each said textured material layer is oriented so as to define a surface-to-surface interface with a second surface of a material layer of a double layer element.

In one aspect of the inventive subject matter, each said textured material layer is the same.

In another aspect of the inventive subject matter, said at least one textured material layer is different than other textured material layer(s).

Figure 2B:
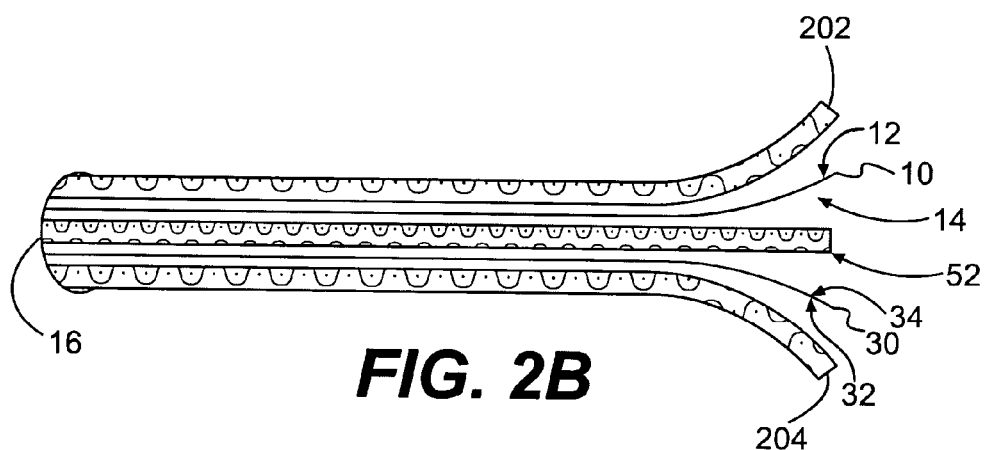
FIG. 2B is a cross-sectional drawing which depicts an exemplary symmetrical device, having three double-layer elements and a single textured layer bound together by a finishing strip, according to the inventive subject matter.

In an exemplary aspect of the inventive subject matter depicted in FIG. 2B, a textured layer of fabric is inserted inside of a double layer element (200), which is then inserted between two other double layer elements (202 and 204). However, there are many possible variations. It is contemplated to be within the scope of the inventive subject matter that the orientation of a textured layer is inside or outside of a double layer element, and may be placed in any relation to a double layer element except immediately next to the skin of a user. In this regard, it is preferred that the placement of a textured layer be more or less symmetrical to double layer elements. By "more or less symmetrical," Applicant intends that approximately the same number of fabric layers be placed on each side of a textured layer. For example, in placing a textured layer in relation to four double layer elements in such a preferred embodiment, two double layer elements on each side of the textured layer is symmetrical, while one double layer element on one side and three on the other side is not.

As a further example of alternate device configurations according to the inventive subject matter, Applicant refers to a three double layer device where the double layer elements are referenced as 1, 2, and 3, with 2 being the middle double layer element. A variety of textured fabrics, for example a, b, and c, can be inserted, and optionally permanently affixed, inside the layers of elements 1, 2, and 3, which will result in a variety of sensations. For instance, the following non-limiting examples may be assembled:

a, b, or c inside 2, with none inside 1 and 3 (standard inventive device with textured layer(s) added);

a, b, or c in 1, with none in 2 and 3;

a in 1, b in 2, none in 3;

b in 1, a in 2, none in 3;

a in 1, b in 2, c in 3; and a in 1, c in 2, b in 3.

The above combinations can be achieved utilizing removable pieces of textured fabrics. In one aspect, they would be unattached, although to avoid the tendency to float around and bunch up or fold over, textured fabric layers are preferably attached to one or both layers of a double layer element, using a method of attachment selected from such devices as buttons and button-holes, snaps, and hook-and-eye devices.

The fabrics that are used to create the frictionless surfaces on the inside the inventive device can be chosen based on the Fabric Index for purposes of creating the internal slipping motion that is desired. Independent of this characteristic, other fabrics can be chosen for the outside surfaces, depending on the proposed use or preferences of the individuals who will utilize it. An example is a children's blanket that has flannel or fleece on the bottom surface next to the child and a silky fabric on top; or one with flannel on the bottom and fleece on the top surface.

In a preferred embodiment of the inventive device for providing a pleasurable massage sensation to an animal, said animal is selected from the group consisting of mammals, birds, and reptiles.

Inventive Methods

The inventive subject matter further relates to a method for simulating a lubricant-aided massage on the skin of an animal, without the use of a lubricant composition on the skin of said animal, comprising the steps of:

(a) providing a multi-layer massage device comprising:
  (i) a first non-rigid material layer having a first surface and a second surface;
  (ii) a second non-rigid material layer having a first surface and a second surface,
    wherein said second surface of said first material layer and said second surface of said second material layer are oriented so as to define an internal surface-to-surface interface between said first and second material layers, and said first and second material layers are fixedly attached together to form a first double layer element;
  (iii) a third non-rigid material layer having a first surface and a second surface; and
  (iv) a fourth non-rigid material layer having a first surface and a second surface,
    wherein said second surface of said third material layer and said second surface of said fourth material layer are oriented so as to define an internal surface-to-surface interface between said third and fourth material layers, and said third and fourth material layers are fixedly attached together to form a second double layer element, and
    wherein a fabric index of an external surface-to-surface interface between the first surfaces of a pair of material layers is greater than or equal to about 10;
(b) orienting said massage device such that a first surface of one of said double layer elements is in contact with said animal; and
(c) manipulating said massage device in a manner that said manipulation results in sliding between said first surfaces of said first and second double layer elements at said external surface-to-surface interface.

Although a single massage will be enjoyable, the effects of massage are cumulative and a course of massage treatments will bring the most benefits. Regular massage can have the effect of strengthening and toning the entire body mechanism, and so help to prevent unnecessary strains and injuries that might otherwise occur due to excess tension and any resulting structural weaknesses. Massage can stimulate or calm the nervous system-depending upon what is required by the individual-and thus help reduce fatigue, leaving the receiver with a feeling of replenished energy. At its best, massage has the potential to restore the individual physically, mentally, and spiritually.

Some of the most important benefits of massage are the following:

Physical Level
  Deep relaxation and stress reduction
  Relief of muscle tension and stiffness
  Reduced muscle spasm and tension
  Relief from entrapment of nerves in muscle
  Greater joint flexibility and range of motion
  Increased ease and efficiency of movement
  Promoted deeper and easier breathing
  Better circulation of both blood and lymph fluids
  Reduced blood pressure
  Relief of tension-related or eye-strain headaches
  Healthier, better nourished skin
  Improved posture
  Faster healing from pulled muscles and sprained ligaments
  Reduces pain, swelling, and formation of scar tissue following injury
  General health maintenance Mental Level
  Relaxed state of alertness
  Reduced mental stress: a calmer mind
  Greater ability to monitor stress signals and respond appropriately
  Increased capability for clearer thinking Emotional Level
  Feeling of well-being
  Reduced levels of anxiety
  Increased awareness of mind-body connection
  Enhanced self image
  A sense of being unified and in harmony In a preferred embodiment, one or more of said first material surfaces is treated with a friction inhibiting treatment.

In another preferred embodiment, said first surface of said double layer element which is in contact with said animal remains in an essentially fixed position in relation to said animal during said manipulation.

In one aspect of the inventive method, said animal is clothed.

In another aspect of the inventive method, said animal is unclothed.

In another preferred embodiment, a fabric index of said interface between said first surfaces of said first and second double layer elements is greater than or equal to about 15.

In a more preferred embodiment, a fabric index of said interface between said first surfaces of said first and second double layer elements is greater than or equal to about 20.

In a most preferred embodiment, a fabric index of said interface between said first surfaces of said first and second double layer elements is greater than or equal to about 25.

In a further aspect of the inventive method, the device used in said method further comprises one or more additional double layer element(s), each said one or more additional double layer element(s) comprising:
  (a) a first non-rigid material layer having a first surface and a second surface; and
  (b) a second non-rigid material layer having a first surface and a second surface,
    wherein said second surface of said first material layer and said second surface of said second material layer are oriented so as to define an internal surface-to-surface interface between said first and second material layers.

In a preferred embodiment, said device comprises a plurality of double layer elements numbering less than about ten double layer elements.

In another preferred embodiment, said device comprises a plurality of double layer elements numbering between three and five double layer elements.

In one aspect of the inventive subject matter, said animal is selected from the group consisting of mammals, birds, and reptiles.

In a preferred embodiment, said animal is human.

In another preferred embodiment, said animal is a human child.

In a further preferred embodiment, said animal is a premature human baby. The inventive devices can be used in neonatal units in hospitals for soothing newborns, and special kits would be provided for the treatment of premature infants. Research related to infants, especially premature infants, indicates that premature infants respond better to massage done with oil than without. The inventive device provides an oil-like massage that is appropriate for premature infants. It is apparent that massage is important for this group, since the appropriate development of the neurological system appears to depend on it.

A problem with prior art treatments for premature infants is that very premature infants don't tolerate touch very well. One study showed seizure-like electroencephalograms, without corresponding physical seizures, when premature infants were touched too young or in the wrong manner. In utero, sensations would only be mild pressure, nothing like a person's finger rubbing over their skin. Stimulation of premature infants through special inventive devices with extra layers of fabric are expected be better tolerated. This is because such sensations are more diffuse and bear a greater resemblance to the normal intrauterine sensations that are experienced through the liquid interface in that environment. Thus, the inventive devices are part of a gradual gradient of tactile stimulation: it is expected that treatment will begin by massaging with a thicker inventive device, for example 8 layered, and as the premature infant became accustomed to it, graduate to a 6 layer and then to a 4 layer device, and eventually the normal touch a caregiver's hand.

In a further aspect of the inventive method, said device additionally comprises a non-rigid, textured material layer having a textured surface, wherein said textured surface is oriented so as to define a surface-to-surface interface between (a) said textured surface and (b) either said first or said second surface of a double layer element.

In a preferred embodiment, each said textured material layer is oriented so as to define a surface-to-surface interface with a second surface of a material layer of a double layer element.

In another preferred embodiment, an additional double layer element additionally comprises a non-rigid, textured material layer having a textured surface, wherein said textured surface is oriented so as to define a surface-to-surface interface between (a) said textured surface and (b) either said first or said second surface of a material layer of a double layer element.

Figure 2C:
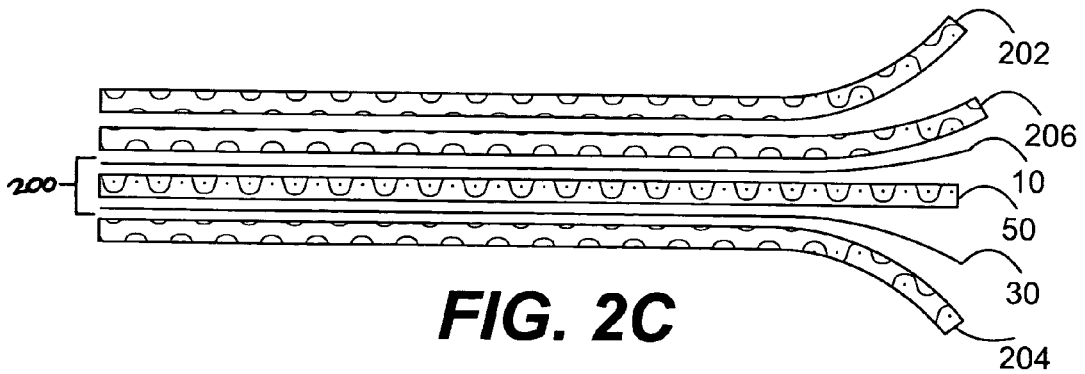
FIG. 2C is a cross-sectional drawing which depicts an exemplary asymmetrical device incorporating a textured layer, having four double-layer elements and a single textured layer, according to the inventive subject matter.

In a further preferred embodiment, said device comprises a plurality of double layer elements, and further comprises one textured material layer, for example as shown in FIG. 2C.

In another aspect, said device comprises a plurality of double layer elements, and further comprises a textured material layer for each double layer element.

In another aspect, said device comprises a plurality of double layer elements, and further comprises a plurality of textured material layers which is greater than one and less than the number of double layer elements.

In another aspect of the inventive method, each said textured material layer is oriented so as to define a surface-to-surface interface with said first surface of said first material layer, said first surface of said second material layer, or both.

In a preferred embodiment, each said textured material layer is the same.

In another preferred embodiment, said at least one textured material layer is different than other textured material layer(s).

The inventive subject additionally relates to a method for treating or preventing a cause or a symptom of a disease, disorder, or condition in an animal in need thereof, by administering a therapeutic massage, comprising the steps of:

(a) providing a multi-layer massage device comprising:
(i) a first non-rigid material layer having a first surface and a second surface;
(ii) a second non-rigid material layer having a first surface and a second surface,
wherein said second surface of said first material layer and said second surface of said second material layer are oriented so as to define an internal surface-to-surface interface between said first and second material layers, and said first and second material layers are fixedly attached together to form a first double layer element;
(iii) a third non-rigid material layer having a first surface and a second surface; and
(iv) a fourth non-rigid material layer having a first surface and a second surface,
wherein said second surface of said third material layer and said second surface of said fourth material layer are oriented so as to define an internal surface-to-surface interface between said third and fourth material layers, and said third and fourth material layers are fixedly attached together to form a second double layer element, and
wherein a fabric index of an external surface-to-surface interface between the first surfaces of a pair of material layers is greater than or equal to about 10;
(b) orienting said massage device such that a first surface of one of said double layer elements is in contact with said animal; and
(c) manipulating said massage device in a manner that said manipulation results in sliding between said first surfaces of said first and second double layer elements at said external surface-to-surface interface.

In a preferred embodiment, one or more of said first material surfaces is treated with a friction inhibiting treatment.

In one aspect of the inventive method, said first surface of said double layer element which is in contact with said animal remains in an essentially fixed position in relation to said animal during said manipulation.

In another aspect of the inventive method, said disease, disorder, or condition is selected from the group consisting of pain, tension, psychological upset, misaligned anatomical structure, sexual dysfunction, premature birth, and physical injury. In particular, the inventive devices and methods are expected to be highly effective for the treatment of headaches, treatment of back pain, and full-body massage for relaxation. In addition to male and female genital stimulation for pleasure, as discussed below, treating disease processes specifically includes sexual dysfunction.

Pregnancy is an exemplary condition that is particularly well suited to application of the inventive methods. It has recently been reported by Tiffany Field, Ph.D., from the Touch Research Institute at the University of Miami School of Medicine, that when 28 depressed pregnant women received two 20-minute massages a week from their partners, they had a 70% reduction in sad moods after 16 weeks and 31% fewer complications such as premature birth, compared with 56 depressed mothers-to-be who didn't get regular massages. Massage appears to work on the body's neurochemistry. Mood boosting serotonin jumped 17% in the massage group, while levels of the stress hormone cortisol plummeted by 23%. Elevated cortisol levels are linked to both depression and premature birth. Earlier massage studies found other benefits: fewer sleep disturbances, less back pain, and a reduction in labor pain and duration.

The inventive devices, particularly with textured layer(s) added, have demonstrated unexpected therapeutic benefits, the degree of which is difficult to scientifically explain. It is safe to assume that, compared to the basic inventive device, texture creates additional vasodilatation and increased blood flow in the areas being massaged as a result of micro-stimulation from the "nubs" in the textured fabric. It is expected that this will make the inventive device with textured layer(s) more effective with regard to decreasing muscle soreness, which is usually caused by a buildup of lactic acid. Without being bound to any particular mechanism of action, the improved blood circulation is expected to both wash away lactic acid and promote faster healing of injured tissue. Other than the possibility that acupuncture points may also be stimulated by the inventive device with textured layer(s), it is difficult to explain the degree of pain relief and functional improvement that Applicant's patients are reporting. In summary, Applicant's patients are reporting less pain and better physical functioning than they have experienced in many years, even with physical therapy, after only brief treatment with the inventive device with textured layer(s) added. Conditions reportedly improved include degenerative back pain, arthritis, knee injury pain, sprained ankle and carpel tunnel syndrome.

There is a wide spectrum of uses and effects related to sex therapy applications. Doing regular massage can be looked at as the first step on the pathway to intimacy, sexual and otherwise, providing a way for couples to connect with one another. The inventive subject matter offers a variety of benefits, but at its most fundamental level, it is a tool that helps people to connect with one another in a deep and pleasurable manner. It does this through its ability to modify the physical sensation of touch, creating an intensely enjoyable and relaxing experience. This feature enhances the practice of massage and provides an opportunity for people to experience a profound sense of closeness and sharing. We normally connect with others through the usual means of communication, which includes words, tone of voice, gestures, and facial expressions. While these means of communication transmit information and reflect our feelings, none create the direct connection that is experienced through soothing touch.

So massage and connecting to one's partner are at one end of the spectrum. The inventive devices can also be used on oneself, on one's sexual partner, or by one's sexual partner on oneself in a sexually stimulating manner, to create a kaleidoscopic array of intense sexual sensations leading to enhanced orgasms in both men and women. Through his medical practice, Applicant is aware of at least two women who struggled with the length of time they needed for orgasms, who were able to achieve orgasms more quickly and more intensely using an inventive device within the scope of the present claims.

In another preferred embodiment, a fabric index of said interface between said first surfaces of said first and second double layer elements is greater than or equal to about 15.

In a more preferred embodiment, a fabric index of said interface between said first surfaces of said first and second double layer elements is greater than or equal to about 20.

In a most preferred embodiment, a fabric index of said interface between said first surfaces of said first and second double layer elements is greater than or equal to about 25.

In a further aspect of the inventive method, said device further comprises one or more additional double layer element(s), each said additional double layer element comprising:
  (a) a first non-rigid material layer having a first surface and a second surface; and
  (b) a second non-rigid material layer having a first surface and a second surface,
    wherein said first surface of said first material layer and said first surface of said second material layer are oriented so as to define an internal surface-to-surface interface between said first and second material layers.

In one preferred embodiment, said device comprises a plurality of double layer elements numbering less than about ten double layer elements.

In another preferred embodiment, said device comprises a plurality of double layer elements numbering between two and five double layer elements.

In one aspect, said animal is selected from the group consisting of mammals, birds, and reptiles.

In a preferred embodiment, said animal is human.

In another preferred embodiment, said animal is a human child.

In a further preferred embodiment, said animal is a premature human baby.

In another aspect of the inventive method, said animal is non-human.

In a preferred embodiment, said non-human animal is a domesticated animal.

In a more preferred embodiment, said disease, disorder, or condition comprises an animal-management component in a treatment context which is selected from the group consisting of veterinary, animal training, animal obedience, animal display, animal contests, animal husbandry, animal sales, and commercial animal farming.

In another aspect of the inventive method, said device additionally comprises a non-rigid, textured material layer having a textured surface, wherein said textured surface is oriented so as to define a surface-to-surface interface between (a) said textured surface and (b) either said first or said second surface of either said first or said second surface of a double layer element.

In an exemplary aspect of the inventive subject matter, a textured layer of fabric is inserted inside of a double layer element, which is then inserted between two other double layer elements, in order to create a variety of specific sensations within the frictionless interfaces which allows for variations on the simulation of a lubricant aided massage. The fabric "nubs" comprising the texturing are more stimulating in regard to increasing local vascular circulation, and it is observed that the areas massaged become reddened, and are expected to be more effective for pain relief because of this attribute.

In a preferred embodiment, each said textured material layer is oriented so as to define a surface-to-surface interface with a second surface of a material layer of a double layer element.

In an alternate aspect of the inventive subject matter, an additional double layer element additionally comprises a non-rigid, textured material layer having a textured surface, wherein said textured surface is oriented so as to define a surface-to-surface interface between (a) said textured surface and (b) either said first or said second surface of a material layer of a double layer element.

In one preferred embodiment, said device comprises a plurality of double layer elements, and further comprises one textured material layer.

In another preferred embodiment, said device comprises a plurality of double layer elements, and further comprises a textured material layer for each double layer element.

In a further preferred embodiment, said device comprises a plurality of double layer elements, and further comprises a plurality of textured material layers which is greater than one and less than the number of double layer elements.

In one aspect, each said textured material layer is oriented so as to define a surface-to-surface interface with a second surface of a material layer of a double layer element.

In one preferred embodiment, each said textured material layer is the same.

In another preferred embodiment, said at least one textured material layer is different than other textured material layer(s).

Further, the inventive subject matter relates to a method for genital stimulation, for the pleasure of a male or female human, comprising the steps of:
(a) providing a multi-layer massage device comprising:
   (i) a first non-rigid material layer having a first surface and a second surface;
   (ii) a second non-rigid material layer having a first surface and a second surface,
      wherein said second surface of said first material layer and said second surface of said second material layer are oriented so as to define an internal surface-to-surface interface between said first and second material layers, and said first and second material layers are fixedly attached together to form a first double layer element;
   (iii) a third non-rigid material layer having a first surface and a second surface; and
   (iv) a fourth non-rigid material layer having a first surface and a second surface,
      wherein said second surface of said third material layer and said second surface of said fourth material layer are oriented so as to define an internal surface-to-surface interface between said third and fourth material layers, and said third and fourth material layers are fixedly attached together to form a second double layer element, and
   wherein a fabric index of an external surface-to-surface interface between the first surfaces of a pair of material layers is greater than or equal to about 14;
(b) orienting said massage device such that a first surface of one of said double layer elements is in contact with the genitals of said animal; and
(c) manipulating said massage device in a manner that said manipulation results in sliding between said first surfaces of said first and second material layers at said surface-to-surface interface.

Another goal of the inventive subject matter is to provide a simple, quick, and effective way for men or women to sexually stimulate themselves or their partners. The inventive devices also have highly stimulating effects on men and women not experiencing sexual dysfunction. Used with some creativity on the part of the user(s), prolonged, kaleidoscopic sexual stimulation can be created, leading to improved orgasms.

Genital stimulation requires much more specific fabric requirements than what is needed for general massage. The requirement of creating the near frictionless fabric interface that is needed for the device to work for general massage is quite easy to achieve compared to what is needed for genital stimulation. When doing general massage the fabric would seldom remain over any particular area of the skin for longer than a minute or so. Therefore, the "feel" of the fabric is important but not absolutely critical. But when using the inventive device for genital stimulation, the fabric remains over one area of skin; arguably the most sensitive skin on the body. The sensations produced need to remain pleasant even if the inventive device is rubbed intensely for an extended period of time. In this case, a subtle difference in the fabric sheen can create enormous differences in sensations. Even the tiniest, most subtle amount of fabric "itch," that would be unnoticeable with general massage, could become quite uncomfortable over the genitalia. Thus, in one aspect of the inventive method, one or more of said first material surfaces is treated with a friction inhibiting treatment.

In a preferred embodiment, said second surface of said material layer which is in contact with the genitals of said animal remains in an essentially fixed position in relation to said animal during said manipulation.

In his medical practice, Applicant has a patient who has reported using an inventive device intra-vaginally during intercourse; since the inventive device works even when wet, such an additional embodiment is within the scope of the inventive subject matter contemplated.

In a more preferred embodiment, a fabric index of said interface between said first surfaces of said first and second double layer elements is greater than or equal to about 20.

In a most preferred embodiment, a fabric index of said interface between said first surfaces of said first and second double layer elements is greater than or equal to about 25.

In another aspect of the inventive method, said device further comprises one or more additional double layer element(s), each said one or more additional double layer element(s) comprising:
(a) a first non-rigid material layer having a first surface and a second surface; and
(b) a second non-rigid material layer having a first surface and a second surface,
   wherein said first surface of said first material layer and said first surface of said second material layer are oriented so as to define an internal surface-to-surface interface between said first and second material layers.

In a preferred embodiment, said device comprises a plurality of double layer elements numbering less than about ten double layer elements.

It should be noted that the genital sensations created by the inventive device with textured layer(s), with men, have a very wide range, becoming more intense and qualitatively different as the penis enlarges and becomes harder. This is likely caused by nerve endings being pushed toward the surface of the skin from deep blood engorgement in the corpus cavernosum pushing outward. When one or more the inventive devices are used over a textured layer, a kaleidoscopic effect of constantly changing sensations is created.

The inventive devices with or without textured layer(s), or a combination of the two can be used by individuals or couples for erotic stimulation of various areas of the body. The possible applications of the inventive devices for sexual stimulation are only limited by the imaginations of the individuals using them.

The present method for creating a variety of pleasant sexual sensations is optionally practiced with the aid of a kit incorporating an inventive device. Kits can be tailored specifically for men or women. An exemplary kit comprises: 1) a variety of 5-10 inventive devices, each made with fabrics of somewhat different frictional characteristics, 2) one or two inventive devices with textured layer(s), and having different textured fabrics, and for a female kit, 3) an electric vibrator. The inventive devices can be used singly or combined with others to create various sensations.

For example, when "tossed" together over genitals, the layering, folds, and subtle differences in the feel of fabric surfaces create a variety of sensations. When a hand rubs over a number of inventive devices, the inventive devices slide and change orientation relative to one another, which creates constant changes in sensations. The manner in which a hand is used to massage through the inventive devices also creates a variety of sensations depending on degree of pressure, rate and degree of movement, and the part of the hand being used, for example the finger tips, fingers, and/or palm of the hand.

Inventive devices with textured layer(s), with their own inherent sensations, can then be added to double layer element inventive devices for additional variations. The sensations that are created vary depending on which position the textured layer(s) occupy within or on the double layer elements. Further, it is expected that women will enjoy the sensations that are created when a vibrator is used through various combinations of inventive devices.

In another preferred embodiment, said device comprises a plurality of double layer elements numbering between two and five double layer elements.

It is expected that too many fabric layers would at some point start to be a problem for clitoral stimulation, but for penile stimulation that is not the case. Applicant has tested as many as 10 double layers and each layer alters the sensations in subtle and interesting ways, although when too many layers are present, grasping the penis starts to become problematic.

Using layers with a variety of fabrics with different surface characteristics and sensations in the layers and changing which one is next to the penis also creates a variety of sensations. In addition, inserting a textured fabric layer in various positions in the stack, although preferably not on the very top layer, creates another way to vary the sensations. Adding these factors together, along with the various folds and ripples of fabric, creates a kaleidoscope of pleasurable sensations.

In a further aspect of the inventive method, said device additionally comprises a non-rigid, textured material layer having a textured surface, wherein said textured surface is oriented so as to define a surface-to-surface interface between (a) said textured surface and (b) either said first or said second surface of a double layer element.

In one aspect, each said textured material layer is oriented so as to define a surface-to-surface interface with a second surface of a material layer of a double layer element.

In another aspect of the inventive method, at least one additional double layer element additionally comprises a non-rigid, textured material layer having a textured surface, wherein said textured surface is oriented so as to define a surface-to-surface interface between (a) said textured surface and (b) either said first or said second surface of a material layer of a double layer element.

In one aspect, said device comprises a plurality of double layer elements, and further comprises one textured material layer.

In another aspect, said device comprises a plurality of double layer elements, and further comprises a textured material layer for each double layer element.

In yet another aspect, said device comprises a plurality of double layer elements, and further comprises a plurality of textured material layers which is greater than one and less than the number of double layer elements.

In another preferred embodiment, each said textured material layer is oriented so as to define a surface-to-surface interface with a second surface of a material layer of a double layer element.

In one aspect, each said textured material layer is the same.

In another aspect, at least one textured material layer is different than other textured material layer(s).

Finally, the inventive subject matter relates to a method for producing a low friction interface between a first surface, which is a surface of a clothed or unclothed human body, and a second surface, which is a surface of another object, comprising the steps of:

(a) providing a multi-layer interface device comprising:
  (i) a first non-rigid material layer having a first surface and a second surface; and
  (ii) a second non-rigid material layer having a first surface and a second surface,
    wherein said first surface of said first material layer and said first surface of said second material layer are oriented so as to define a surface-to-surface interface between said first and second material layers, and
    wherein a fabric index of said interface between said first and second material layers is greater than or equal to about 10; and
(b) orienting said interface device such that said second surface of said first material layer is in contact with said animal, and said second surface of said second material layer is in contact with said second surface of said other object,
    wherein upon application of a force to said animal or said other object, said interface device permits sliding between said first surfaces of said first and second material layers.

In one aspect of the inventive method, said force has a component which is normal to a point on said surface-to-surface interface, and said sliding occurs at said point on said surface-to-surface interface.

In a preferred embodiment, said second surface is selected from the exemplary group consisting of a chair seat, a bicycle seat, a bed, an electric massager, and a vibrator. However, the inventive devices are not limited to providing a slippery interface with only these exemplary second surfaces; one of ordinary skill in the art will recognize that an inventive device is used in any situation where there is a need to create a low friction interface between the human body and the surface of another object, such as the examples involving a chair seat; a bicycle seat; an electric massager; a vibrator; bed sheets, for example as might be used to minimize bed sores for the bedridden, or to decrease pain for burn victims and people with painful skin conditions; and other surfaces. It will be understood by one of ordinary skill in the art that the inventive methods use an inventive device which has a minimum of two material layers, and preferably three or four material layers.

For a method using a two layer device, the low-friction faces of the two material layers form a surface-to-surface interface which allows for sliding between the layers. In that instance, the interface with the human body is formed with a rough, high-friction second surface of a material layer, and the interface with the second surface is also formed with a rough, high-friction second surface of a material layer. Thus, for a method using a two layer device, it is preferred that the human body be clothed in order to avoid skin irritation from the rough surface.

For a method using a three or four layer device, the low-friction faces of two of the material layers still form a surface-to-surface interface which allows for sliding between the layers. However, in that instance the interface with the human body is preferably formed with a low-friction first surface of a material layer, and the interface with the second surface is formed with either a rough, high-friction second surface in a three layer device, or a low-friction first surface in a four layer device. Thus, for a method using a three or four layer device in which a first surface forms an interface with a surface of a human body, the human body is optionally clothed or unclothed. In addition, it is expected that a method using a two or three layer device is utilized in those situations in which it is desired that the interface between the device and the second surface does not permit significant sliding, while a four layer device is preferably utilized in those situations in which it is desired that the interface between the device and the second surface does permit sliding.

The sensations that are transmitted through the inventive device can originate from the hand of the person receiving the massage, another individual's hand, or a mechanical device such as an electric massager. Thus, in an alternate aspect of the inventive subject matter, the inventive device is optionally incorporated with a mechanical device. The inventive device is then made in the shape, for example, of the moving surface of electric massagers or vibrators, or built into a massage chair cover.

EXAMPLES

The following examples are illustrative of the inventive subject matter and are not intended to be limitations thereon.

Example 1

KES Test Results

The following example illustrates the results of testing fabric samples conducted using the Kawabata Evaluation System to define the most ideal fabrics for use in the inventive devices and to analyze fabric characteristics to define specific parameters relevant to the function of the inventive devices, provided according to the inventive subject matter. The parameters and characteristics of the KES method are described in detail below.

The most relevant KES measurements are the surface properties measured as coefficient of friction and geometric roughness. Thermal properties, bending properties, tensile properties, shear properties, and lateral compression properties are not considered especially relevant to the function of the inventive devices.

Applicant subjectively graded thirty fabric samples on a 1-10 scale, with high values, i.e. fabrics in the 9-10 range, representing what he determined to be ideal fabrics, and subjective values of 4-6 representing a demarcation line for fabrics which slide on their inner face-to-face interface when normal hand pressure is applied and thus are within the scope of the inventive subject matter.

Applicant conducted a series of tests on a representative sample, ten of the thirty fabrics subjectively graded. The results are shown in Table 1. For the test data, the following terms and definitions apply:

MIU1 is friction in the warp direction.

MIU2 is friction in the weft direction.

MMD1 is mean deviation of MIU in the warp direction (smoothness).

MMD2 is mean deviation of MIU in the weft direction (smoothness).

SMD1 is surface mean deviation in the warp direction (roughness in microns).

SMD2 is surface mean deviation in the weft direction (roughness in microns).

The tests were conducted using the Kawabata KES system and replicated for statistical significance.

Applicant then created a Fabric Index based on the friction measurements. The Fabric Index is defined as follows: Fabric Index=Smoothness ratio MMD1/MMD2 divided by Warp Direction Friction. The Mean Deviation of the friction measurement is a statistical term derived from taking the average of over 100 measurements and then seeing what the Mean Deviation from the average is. That is an indication of the variation of the friction. The variation is caused by the surface roughness, so that is why we called the "mean deviation" smoothness. The number is calculated automatically by the KES system.

Figure 3:
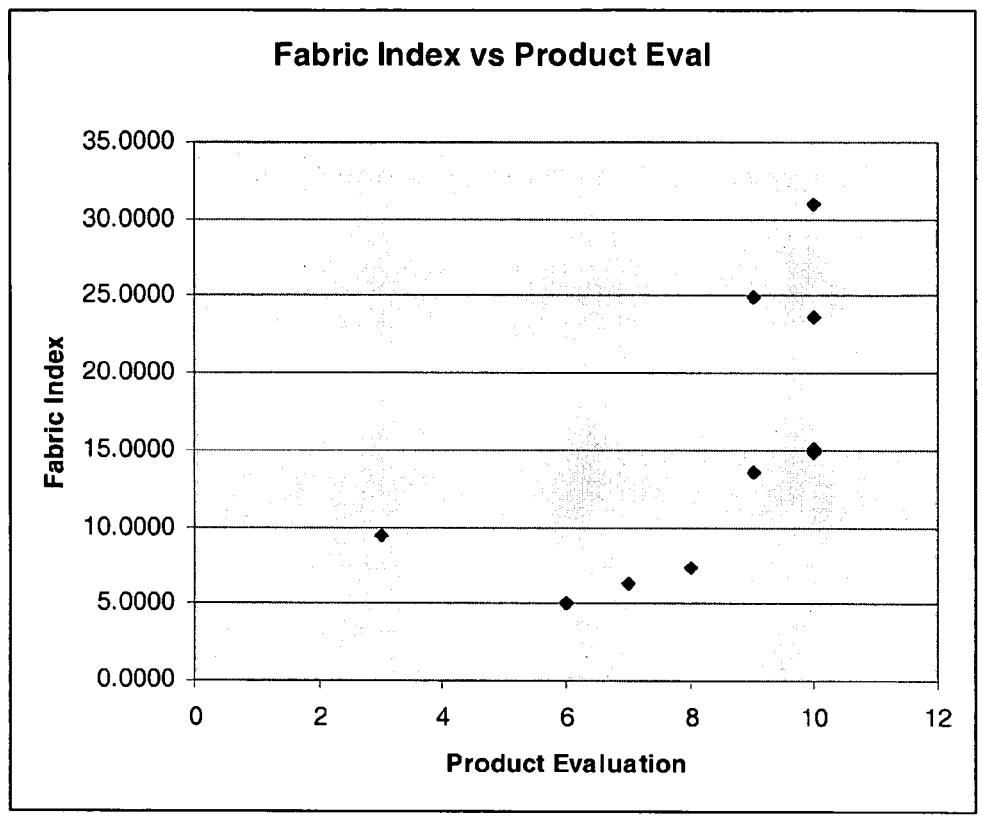
FIG. 3 is a graph which depicts the correlation between subjective evaluation and Fabric Index score for ten tested fabrics.

The Fabric Index for tested fabrics ran from 5 to 31. When correlated with Applicant's overall fabric evaluation, there is a very good correlation between subjective rating and Fabric Index score. The graph in FIG. 3 shows than a Fabric Index over 10 will make good product. The Fabric Index data was normalized against the fabric with the lowest index, Fabric #27.

Using the Fabric Index, additional preferred fabrics were identified. They are listed as Fabrics PS and TF in Table 1.

TABLE 1

Master Evaluation Table

| Fabric No. | Overall | Softness | Stimulation | Stiffness | Thickness | Smoothness (finger to fabric friction) | Smoothness (face to face fabric friction) | MIU1 |
|---|---|---|---|---|---|---|---|---|
| 1 | 10 | 10 | 0 | 1 | 5 | 5 | 5 | 0.1255 |
| 2 | 10 | 10 | 0 | 1 | 4 | 5 | 5 | 0.188 |
| 5 | 10 | 8 | 3 | 2 | 3 | 6 | 6 | 0.144 |
| 9 | 10 | 9 | 3 | 2 | 4 | 5 | 4 | 0.1765 |
| 10 | 9 | 9 | 2 | 3 | 7 | 6 | 6 | 0.1185 |
| 14 | 9 | 8 | 4 | 1 | 5 | 6 | 6 | 0.1695 |
| 19 | 8 | 7 | 4 | 2 | 6 | 3 | 3 | 0.2175 |
| 23 | 7 | 5 | 3 | 4 | 4 | 1 | 1 | 0.2515 |
| 27 | 6 | 6 | 4 | 3 | 6 | 2 | 2 | 0.2385 |
| 30 | 3 | 4 | 8 | 8 | 7 | 5 | 4 | 0.1885 |
| PS | | | | | | | | 0.175 |
| TF | | | | | | | | 0.119 |

| Fabric No. | MIU2 | MMD1 | MMD2 | SMD1 | SMD2 | Smoothness Ratio MMD2/MMD1 | Fabric Index | RANK of Fabric Index |
|---|---|---|---|---|---|---|---|---|
| 1 | 0.274 | 0 | 0.01 | 1.49 | 3.48 | 3.8947 | 31.0338 | 6.1931 |
| 2 | 0.2445 | 0 | 0.01 | 0.89 | 2.24 | 2.8333 | 15.0709 | 3.0076 |
| 5 | 0.153 | 0.022 | 0.01 | 6.425 | 1.63 | 2.1333 | 14.8148 | 2.9565 |
| 9 | 0.3035 | 0.01 | 0.03 | 2.01 | 5.27 | 4.1714 | 23.6342 | 4.7165 |
| 10 | 0.2865 | 0.01 | 0.02 | 3.36 | 3.835 | 2.9492 | 24.8874 | 4.9666 |
| 14 | 0.356 | 0.013 | 0.03 | 1.92 | 10.45 | 2.2960 | 13.5457 | 2.7032 |

TABLE 1-continued

| 19 | 0.292 | 0.021 | 0.01 | 7.255 | 3.185 | 1.5909 | 7.3145 | 1.4597 |
| 23 | 0.1895 | 0.013 | 0.02 | 2.14 | 4.05 | 1.5969 | 6.3495 | 1.2671 |
| 27 | 0.2475 | 0.012 | 0.01 | 1.42 | 2.94 | 1.1951 | 5.0110 | 1.0000 |
| 30 | 0.192 | 0.035 | 0.02 | 11.52 | 3.27 | 1.7876 | 9.4831 | 1.8925 |
| PS | 0.293 | 0.01 | 0.01 | 1.45 | 2.23 | 1.9706 | 11.2605 | 2.2472 |
| TF | 0.201 | 0 | 0.02 | 1.495 | 3.67 | 3.8293 | 32.1787 | 6.4216 |

The Kawabata Evaluation System for Fabrics. Kawabata designed the Kawabata Evaluation System for Fabrics ("KES-F") system in 1972 to address a need for instrumentation that would enable fabric parameters to be objectively measured quickly, accurately, and reproducibly (see, e.g. Kawabata, S.; Niwa, M.; & Wang, F. "Objective Hand Measurement of Non Woven Fabrics," Textile Research J p. 597 (1994)]; Bishop, D. P. "Fabrics: Sensory and Mechanical Properties," Textile Progress Vol. 26, No. 3 (1995), and Matsuo, T.; Nasu, N. & Saito, M. "Study on the Hand. Part II. The Method of Measuring Hand," J. Text. Mach. Soc. Jap 17.3 p. 92, (1971)).

The KES system of instruments measures properties of textile fabrics and predicts the aesthetic qualities perceived by human touch. The KES system consists of four instruments: KES-FB1 tensile and shear tester, KES-FB2 bending tester, KES-FB3 compression tester, and KES-FB4 surface-friction and geometrical-roughness tester. The parameters measured by the basic KES-F(B) instruments are the following: bending properties, surface properties (friction and roughness), compression properties, shearing properties, and tensile properties. Each of these categories is comprised of a group of related mechanical properties that can be separately measured.

As relevant to the present inventive subject matter, the KES-FB4 instrument measures friction and roughness parameters. A contactor made of piano wire is placed, under constant tension load of 20 gf/cm, against the respective face and back surfaces of a fabric specimen in the standard test. The deviation of fabric thickness is recorded, from which the mean deviation of surface contour SMD is calculated. Surface friction is measured by using another contactor (made of ten pieces of the same wire as the contactor used for the roughness measurement) placed on the surface of specimen with the compression force of 50 gf. For both tests, the fabric is moved at constant velocity under the contactors.

The KES parameters derived from this instrument are: MIU: Coefficient of friction; MMD: Mean deviation of MIU, and SMD: Geometrical roughness. In general, the smaller the KES MIU value, the smoother the fabric; the larger the KES MIU value, the rougher the fabric. The friction measurement gives a mean value, and a mean deviation, between the static and dynamic coefficients of friction. The geometric-roughness probe is sufficiently sensitive to respond to surface rugosities due to differences in yarn and fabric structure.

Example 2

Early Clinical Results

The following example illustrates early clinical results of the inventive devices, provided according to the inventive subject matter, as observed in Applicant's medical practice. The inventive devices and methods have been very effective for bringing about improved sexual orgasms in both men and women. It should be noted that inventive devices with textured layer(s) added are much more effective for genital stimulation if they are used with, and preferably under, a basic inventive device. Several women have reported an increase in sexual stimulation beyond anything they had previously experienced. Each reported a decrease in the time they needed to reach orgasm by 50-70%, along with greater intensity of orgasm. Results with men have been dramatic and are similarly promising. Further clinical research will be conducted to clarify this application and to identify those fabrics and textures that are most effective for this purpose.

The invention being thus described, it will be obvious that the same may be modified or varied in many ways. Such modifications and variations are not to be regarded as a departure from the spirit and scope of the invention and all such modifications and variations are intended to be included within the scope of the following claims.

I claim:

1. A multi-layered device for providing a pleasurable massage sensation to an animal, comprising:
   (a) a first non-rigid material layer having a first surface and a second surface; and
   (b) a second non-rigid material layer having a first surface and a second surface,
     wherein said first surface of said first material layer and said first surface of said second material layer are oriented so as to define a surface-to-surface interface between said first and second material layers, and a fabric index of said interface between said first and second material layers is greater than or equal to about 10, and
     wherein one or more of said first surfaces is treated with a friction inhibiting treatment and said first surface of said first layer of material has a warp dimension and a weft dimension,
     said first surface of said second layer of material has a warp dimension and a weft dimension,
     the warp dimension of said first layer of material is oriented substantially parallel to the weft dimension of said second layer of material, and
     the warp dimension of said first layer of material is oriented substantially perpendicular to the warp dimension of said second layer of material.

2. The device of claim 1, wherein said non-rigid material is selected from the group consisting of woven fabrics, knit fabrics, non-woven fabrics, and flexible films.

3. The device of claim 2, wherein said non-rigid material is a woven fabric.

4. The device of claim 1, wherein said first non-rigid material layer is fixedly attached to a third non-rigid material layer having a first surface and a second surface, to form a first double layer element, and said second non-rigid material layer is fixedly attached to a fourth non-rigid material layer having a first surface and a second surface, to form a second double layer element, wherein for each said double layer element, said second surfaces are oriented so as to define an internal surface-to-surface interface between a pair of material layers, wherein a fabric index of an external surface-tosurface interface between a pair of double layer elements is greater than or equal to about 10.

5. The device of claim 4, wherein each said material layer has a perimeter defined by the edge(s) of said material layer, and a pair of material layers are fixedly attached together substantially at said perimeters.

6. The device of claim 5, wherein said pair of material layers are of substantially the same size and shape, and said shape is selected from the group consisting of generally rectangular, generally rectangular with radiused corners, generally triangular, generally a parallelogram, generally circular, ellipsoid, or iconic.

7. The device of claim 6, wherein said iconic shape is selected from the group consisting of a hand shape, puppet shapes, a blanket shape, the shape of an article of clothing, the shape of a sporting goods article, a shape associated with a sports team logo or sports league logo, a shape associated with a sports league trophy, and a trademarked shape.

8. The device of claim 4, wherein said pair of material layer is fixedly attached together by process selected from the group consisting of sewing, stitching, stapling, gluing, riveting, heat bonding, mechanical joining, and mechanical fastening.

9. The device of claim 8, wherein said pair of material layer is fixedly attached together by sewing or stitching.

10. The device of claim 4, further comprising a finishing strip substantially covering the edges of said pair of material layers.

11. The device of claim 4, further comprising one or more additional double layer element(s), each said additional double layer element comprising:
 (a) a first non-rigid material layer having a first surface and a second surface; and
 (b) a second non-rigid material layer having a first surface and a second surface,
  wherein for each said additional double layer element, said second surface of said first material layer and said second surface of said second material layer are oriented so as to define an internal surface-to-surface interface between said first and second material layers.

12. The device of claim 11, wherein one or more of said first surfaces is treated with a friction inhibiting treatment.

13. The device of claim 11, wherein a fabric index of an external surface-to-surface interface between two or more double layer elements is greater than or equal to about 10.

14. The device of claim 13, wherein a fabric index of said external surface-to-surface interface between the first material layers of all of said double layer elements is greater than or equal to about 10.

15. The device of claim 14, wherein all of said first surfaces are treated with a friction inhibiting treatment.

16. The device of claim 11, wherein each said double layer element has a perimeter defined by the edge(s) of said material layers, and each said double layer element is fixedly attached together substantially at said perimeter.

17. The device of claim 11, further comprising a finishing strip substantially covering the edges of one or more of said additional double layer element(s).

18. The device of claim 11, comprising less than about ten double layer elements.

19. The device of claim 18, comprising a plurality of double layer elements numbering between two and five double layer elements.

20. The device of claim 1, wherein a fabric index of said interface between said first surfaces of said first and second material layers is greater than or equal to about 15.

21. The device of claim 1, wherein a fabric index of said interface between said first surfaces of said first and second material layers is greater than or equal to about 20.

22. The device of claim 1, wherein a fabric index of said interface between said first surfaces of said first and second material layers is greater than or equal to about 25.

23. The device of claim 4, additionally comprising a non-rigid, textured material layer having a textured surface, wherein said textured surface is oriented so as to define a surface-to-surface interface between (a) said textured surface and (b) either said first or said second surface of any of said material layer(s).

24. The device of claim 23, wherein said textured material layer is oriented between said second surfaces of the material layers of a double layer element.

25. The device of claim 11, wherein an additional double layer element additionally comprises a non-rigid, textured material layer having a textured surface, wherein said textured surface is oriented so as to define a surface-to-surface interface between (a) said textured surface and (b) either surface of either material layer of said double layer element.

26. The device of claim 25, wherein said device comprises a plurality of double layer elements, and further comprises one textured material layer.

27. The device of claim 25, wherein said device comprises a plurality of double layer elements, and further comprises a textured material layer for each double layer element.

28. The device of claim 25, wherein said device comprises a plurality of double layer elements, and further comprises a plurality of textured material layers which is greater than one and less than the number of double layer elements.

29. The device of claim 25, wherein each said textured material layer is oriented so as to define a surface-to-surface interface with a second surface of a material layer of a double layer element.

30. The device of claim 27, wherein each said textured material layer is the same.

31. The device of claim 27, wherein at least one textured material layer is different than other textured material layer(s).

32. The device of claim 1, wherein said animal is selected from the group consisting of mammals, birds, and reptiles.

33. A multi-layered device for providing a pleasurable massage sensation to an animal, comprising:
 (a) a first non-rigid material layer having a first surface and a second surface; and
 (b) a second non-rigid material layer having a first surface and a second surface,
 wherein when said first surface of said first material layer and said first surface of said second material layer are oriented so as to define a surface-to-surface interface between said first and second material layers, and a fabric index of said interface between said first and second material layers is greater than or equal to about 10,
 wherein said first non-rigid material is a woven fabric and said second non-rigid material is a woven fabric,
 wherein said first surface of said first layer of material has a warp dimension and a weft dimension and said first surface of said second layer of material has a warp dimension and a weft dimension, and
 wherein the warp dimension of said first layer of material is oriented substantially parallel to the weft dimension of said second layer of material and substantially perpendicular to the warp dimension of said second layer of material.

34. The device of claim 33, wherein one or more of said first surfaces is treated with a friction inhibiting treatment.

35. The device of claim 33, wherein said first non-rigid material layer is fixedly attached to a third non-rigid material layer having a first surface and a second surface, to form a first double layer element, and said second non-rigid material layer is fixedly attached to a fourth non-rigid material layer having a first surface and a second surface, to form a second double layer element, wherein for each said double layer element, said second surfaces are oriented so as to define an internal surface-to-surface interface between a pair of material layers, wherein a fabric index of an external surface-to-surface interface between a pair of double layer elements is greater than or equal to about 10.

36. The device of claim 35, wherein each said material layer has a perimeter defined by the edge(s) of said material layer, and a pair of material layers are fixedly attached together substantially at said perimeters.

37. The device of claim 36, wherein said pair of material layers are of substantially the same size and shape, and said shape is selected from the group consisting of generally rectangular, generally rectangular with radiused corners, generally triangular, generally a parallelogram, generally circular, ellipsoid, or iconic.

38. The device of claim 37, wherein said iconic shape is selected from the group consisting of a hand shape, puppet shapes, a blanket shape, the shape of an article of clothing, the shape of a sporting goods article, a shape associated with a sports team logo or sports league logo, a shape associated with a sports league trophy, and a trademarked shape.

39. The device of claim 35, wherein said pair of material layer is fixedly attached together by process selected from the group consisting of sewing, stitching, stapling, gluing, riveting, heat bonding, mechanical joining, and mechanical fastening.

40. The device of claim 39, wherein said pair of material layer is fixedly attached together by sewing or stitching.

41. The device of claim 35, further comprising a finishing strip substantially covering the edges of said pair of material layers.

42. The device of claim 35, further comprising one or more additional double layer element(s), each said additional double layer element comprising:
   (a) a first non-rigid material layer having a first surface and a second surface; and
   (b) a second non-rigid material layer having a first surface and a second surface,
      wherein for each said additional double layer element, said second surface of said first material layer and said second surface of said second material layer are oriented so as to define an internal surface-to-surface interface between said first and second material layers.

43. The device of claim 42, wherein one or more of said first surfaces is treated with a friction inhibiting treatment.

44. The device of claim 42, wherein a fabric index of an external surface-to-surface interface between two or more double layer elements is greater than or equal to about 10.

45. The device of claim 44, wherein a fabric index of said external surface-to-surface interface between the first material layers of all of said double layer elements is greater than or equal to about 10.

46. The device of claim 45, wherein all of said first surfaces are treated with a friction inhibiting treatment.

47. The device of claim 42, wherein each said double layer element has a perimeter defined by the edge(s) of said material layers, and each said double layer element is fixedly attached together substantially at said perimeter.

48. The device of claim 42, further comprising a finishing strip substantially covering the edges of one or more of said additional double layer element(s).

49. The device of claim 42, comprising less than about ten double layer elements.

50. The device of claim 49, comprising a plurality of double layer elements numbering between two and five double layer elements.

51. The device of claim 33, wherein a fabric index of said interface between said first surfaces of said first and second material layers is greater than or equal to about 15.

52. The device of claim 33, wherein a fabric index of said interface between said first surfaces of said first and second material layers is greater than or equal to about 20.

53. The device of claim 33, wherein a fabric index of said interface between said first surfaces of said first and second material layers is greater than or equal to about 25.

54. The device of claim 35, additionally comprising a non-rigid, textured material layer having a textured surface, wherein said textured surface is oriented so as to define a surface-to-surface interface between (a) said textured surface and (b) either said first or said second surface of any of said material layer(s).

55. The device of claim 54, wherein said textured material layer is oriented between said second surfaces of the material layers of a double layer element.

56. The device of claim 42, wherein an additional double layer element additionally comprises a non-rigid, textured material layer having a textured surface, wherein said textured surface is oriented so as to define a surface-to-surface interface between (a) said textured surface and (b) either surface of either material layer of said double layer element.

57. The device of claim 56, wherein said device comprises a plurality of double layer elements, and further comprises one textured material layer.

58. The device of claim 56, wherein said device comprises a plurality of double layer elements, and further comprises a textured material layer for each double layer element.

59. The device of claim 56, wherein said device comprises a plurality of double layer elements, and further comprises a plurality of textured material layers which is greater than one and less than the number of double layer elements.

60. The device of claim 56, wherein each said textured material layer is oriented so as to define a surface-to-surface interface with a second surface of a material layer of a double layer element.

61. The device of claim 58, wherein each said textured material layer is the same.

62. The device of claim 58, wherein at least one textured material layer is different than other textured material layer(s).

63. The device of claim 33, wherein said animal is selected from the group consisting of mammals, birds, and reptiles.

64. A multi-layered device for providing a pleasurable massage sensation to an animal, comprising:
   (a) a first non-rigid material layer having a first surface and a second surface; and
   (b) a second non-rigid material layer having a first surface and a second surface,
      wherein said first surface of said first material layer and said first surface of said second material layer are oriented so as to define a surface-to-surface interface between said first and second material layers, and a fabric index of said interface between said first and second material layers is greater than or equal to about 10,
      wherein said first non-rigid material layer is fixedly attached to a third non-rigid material layer having a first surface and a second surface, to form a first double layer element, and said second non-rigid material layer is fixedly attached to a fourth non-rigid material layer having a first surface and a second surface, to form a second double layer element, wherein for each said double layer element, said second surfaces are oriented so as to define an internal surface-to-surface interface between a pair of material layers, wherein a fabric index of an external surface-to-surface interface between a pair of double layer elements is greater than or equal to about 10, the multi-layered device additionally comprising a non-rigid, textured material layer having a textured surface, wherein said textured surface is oriented so as to define a surface-to-surface interface between (a) said textured surface and (b) either said first or said second surface of any of said material layer(s).

65. The device of claim 64, wherein said textured material layer is oriented between said second surfaces of the material layers of a double layer element.

66. The device of claim 64, wherein one or more of said first surfaces is treated with a friction inhibiting treatment.

67. The device of claim 64, wherein a fabric index of an external surface-to-surface interface between two or more double layer elements is greater than or equal to about 10.

68. The device of claim 67, wherein a fabric index of said external surface-to-surface interface between the first material layers of all of said double layer elements is greater than or equal to about 10.

69. The device of claim 68, wherein all of said first surfaces are treated with a friction inhibiting treatment.

70. The device of claim 64, wherein each said double layer element has a perimeter defined by the edge(s) of said material layers, and each said double layer element is fixedly attached together substantially at said perimeter.

71. The device of claim 64, further comprising a finishing strip substantially covering the edges of one or more of said additional double layer element(s).

72. The device of claim 64, comprising less than about ten double layer elements.

73. The device of claim 72, comprising a plurality of double layer elements numbering between two and five double layer elements.

74. The device of claim 64, wherein a fabric index of said interface between said first surfaces of said first and second material layers is greater than or equal to about 15.

75. The device of claim 64, wherein a fabric index of said interface between said first surfaces of said first and second material layers is greater than or equal to about 20.

76. The device of claim 64, wherein a fabric index of said interface between said first surfaces of said first and second material layers is greater than or equal to about 25.

77. A multi-layered device for providing a pleasurable massage sensation to an animal, comprising:
(a) a first non-rigid material layer having a first surface and a second surface; and
(b) a second non-rigid material layer having a first surface and a second surface,
wherein said first surface of said first material layer and said first surface of said second material layer are oriented so as to define a surface-to-surface interface between said first and second material layers, and a fabric index of said interface between said first and second material layers is greater than or equal to about 10,
wherein said first non-rigid material layer is fixedly attached to a third non-rigid material layer having a first surface and a second surface, to form a first double layer element, and said second non-rigid material layer is fixedly attached to a fourth non-rigid material layer having a first surface and a second surface, to form a second double layer element, wherein for each said double layer element, said second surfaces are oriented so as to define an internal surface-to-surface interface between a pair of material layers, wherein a fabric index of an external surface-to-surface interface between a pair of double layer elements is greater than or equal to about 10, the multi-layered device further comprising one or more additional double layer element(s), each said additional double layer element comprising:
(a) a first non-rigid material layer having a first surface and a second surface; and
(b) a second non-rigid material layer having a first surface and a second surface,
wherein for each said additional double layer element, said second surface of said first material layer and said second surface of said second material layer are oriented so as to define an internal surface-to-surface interface between said first and second material layers, and
wherein at least one of said double layer elements additionally comprises a non-rigid, textured material layer having a textured surface, wherein said textured surface is oriented so as to define a surface-to-surface interface between (a) said textured surface and (b) either surface of either material layer of said at least one of said double layer elements.

78. The device of claim 77, wherein said device comprises a plurality of double layer elements, and further comprises one textured material layer.

79. The device of claim 77, wherein said device comprises a plurality of double layer elements, and further comprises a textured material layer for each double layer element.

80. The device of claim 77, wherein said device comprises a plurality of double layer elements, and further comprises a plurality of textured material layers which is greater than one and less than the number of double layer elements.

81. The device of claim 77, wherein each said textured material layer is oriented so as to define a surface-to-surface interface with a second surface of a material layer of a double layer element.

82. The device of claim 77, wherein each said textured material layer is the same.

83. The device of claim 77, wherein at least one textured material layer is different than other textured material layer(s).

84. The device of claim 77, wherein one or more of said first surfaces is treated with a friction inhibiting treatment.

85. The device of claim 77, wherein a fabric index of an external surface-to-surface interface between two or more double layer elements is greater than or equal to about 10.

86. The device of claim 84, wherein a fabric index of said external surface-to-surface interface between the first material layers of all of said double layer elements is greater than or equal to about 10.

87. The device of claim 86, wherein all of said first surfaces are treated with a friction inhibiting treatment.

88. The device of claim 77, wherein each said double layer element has a perimeter defined by the edge(s) of said material layers, and each said double layer element is fixedly attached together substantially at said perimeter.

89. The device of claim 77, further comprising a finishing strip substantially covering the edges of one or more of said additional double layer element(s).

90. The device of claim 77, comprising less than about ten double layer elements.

91. The device of claim 77, comprising a plurality of double layer elements numbering between two and five double layer elements.

92. The device of claim 77, wherein a fabric index of said interface between said first surfaces of said first and second material layers is greater than or equal to about 15.

93. The device of claim 77, wherein a fabric index of said interface between said first surfaces of said first and second material layers is greater than or equal to about 20.

94. The device of claim 77, wherein a fabric index of said interface between said first surfaces of said first and second material layers is greater than or equal to about 25.

95. A multi-layered device for providing a pleasurable massage sensation to an animal, comprising:
(a) a first non-rigid material layer having a first surface and a second surface; and
(b) a second non-rigid material layer having a first surface and a second surface,
wherein said first surface of said first material layer and said first surface of said second material layer are oriented so as to define a surface-to-surface interface between said first and second material layers, and a fabric index of said interface between said first and second material layers is greater than or equal to about 10,
wherein said first non-rigid material layer is fixedly attached to a third non-rigid material layer having a first surface and a second surface, to form a first double layer element, and said second non-rigid material layer is fixedly attached to a fourth non-rigid material layer having a first surface and a second surface, to form a second double layer element, wherein for each said double layer element, said second surfaces are oriented so as to define an internal surface-to-surface interface between a pair of material layers, wherein a fabric index of an external surface-to-surface interface between a pair of double layer elements is greater than or equal to about 10,
wherein at least one of said double layer elements additionally comprises a non-rigid, textured material layer having a textured surface, wherein said textured surface is oriented so as to define a surface-to-surface interface between (a) said textured surface and (b) either surface of either material layer of said at least one of said double layer elements.

96. The device of claim 95, wherein said device comprises a plurality of double layer elements, and further comprises one textured material layer.

97. The device of claim 95, wherein said device comprises a plurality of double layer elements, and further comprises a textured material layer for each double layer element.

98. The device of claim 95, wherein said device comprises a plurality of double layer elements, and further comprises a plurality of textured material layers which is greater than one and less than the number of double layer elements.

99. The device of claim 95, wherein each said textured material layer is oriented so as to define a surface-to-surface interface with a second surface of a material layer of a double layer element.

100. The device of claim 95, wherein each said textured material layer is the same.

101. The device of claim 95, wherein at least one textured material layer is different than other textured material layer(s).

* * * * *